April 14, 1964    A. W. STEWART    3,128,943
CODING MACHINE
Filed July 10, 1961    11 Sheets-Sheet 1
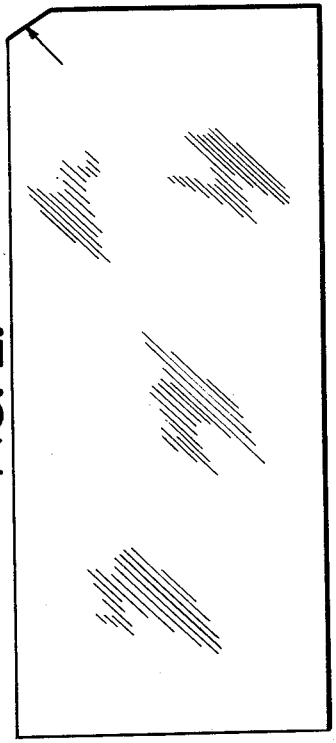
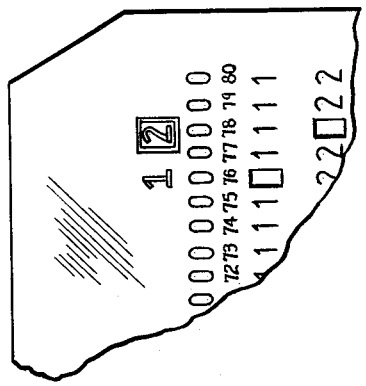
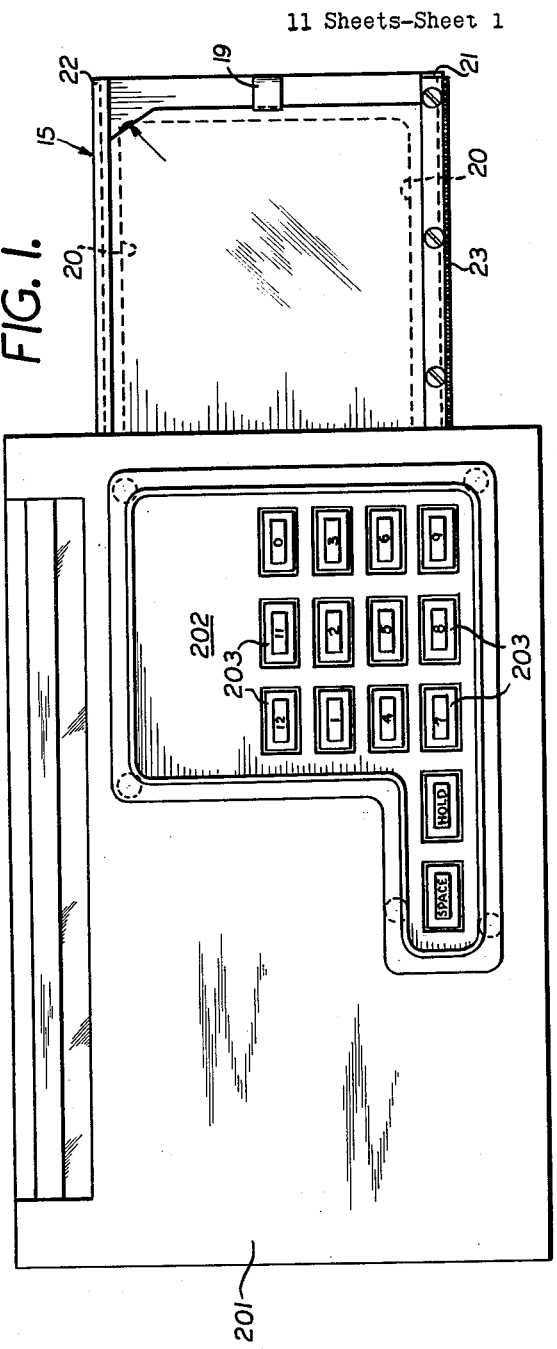
INVENTOR
ALFRED W. STEWART
BY
ATTORNEY.

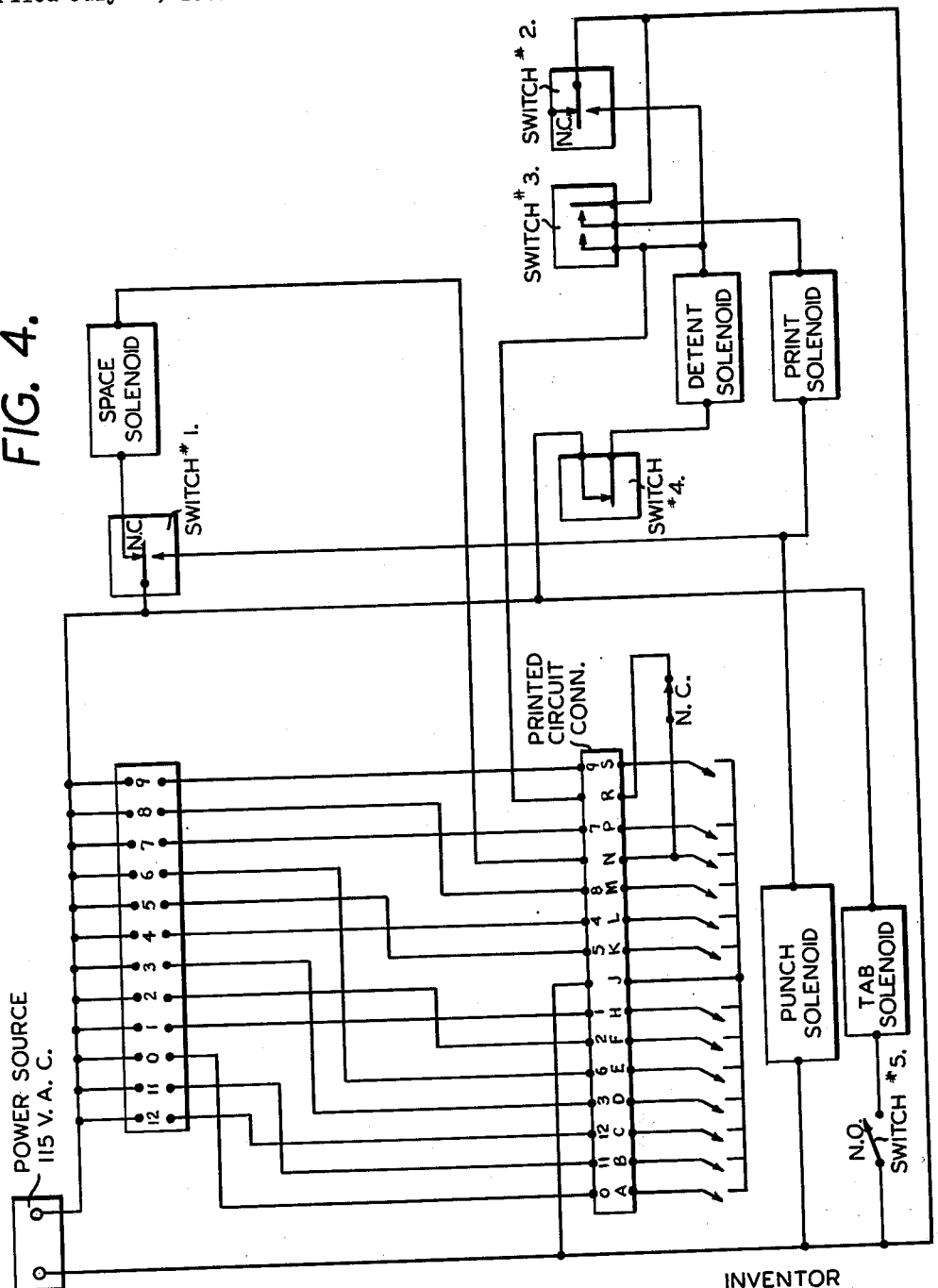

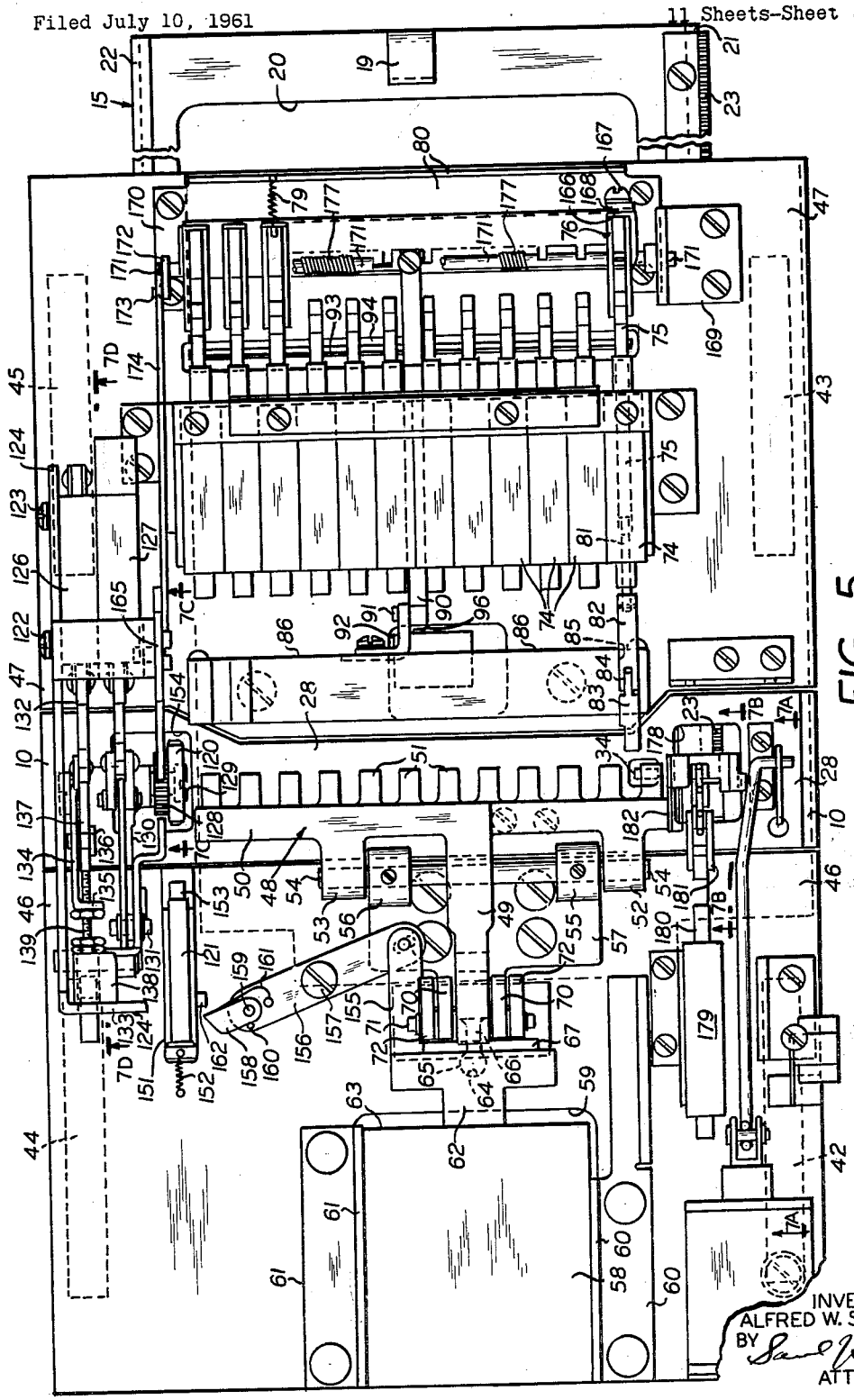

April 14, 1964    A. W. STEWART    3,128,943
CODING MACHINE
Filed July 10, 1961    11 Sheets-Sheet 5
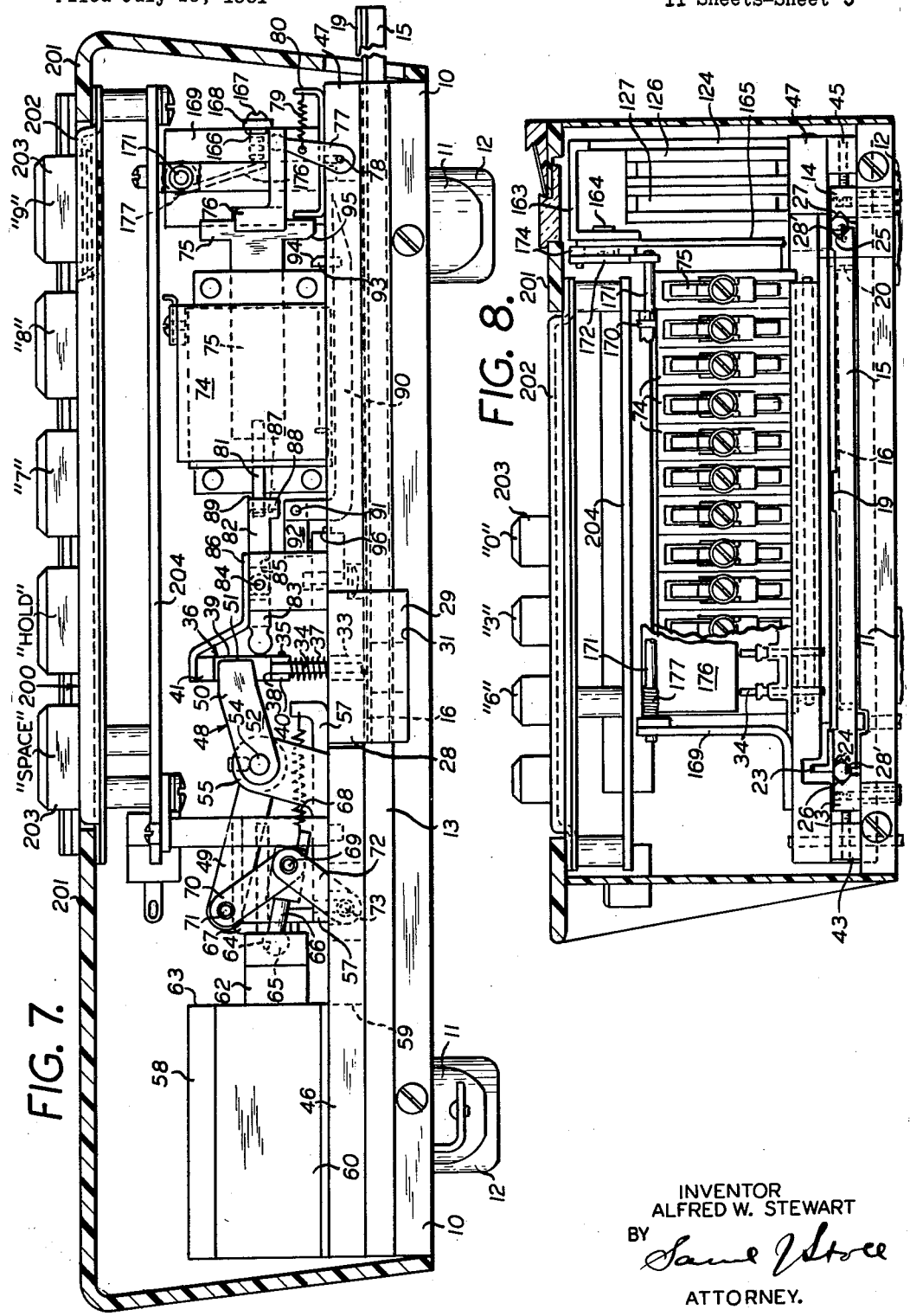
INVENTOR
ALFRED W. STEWART
BY *Sam'l J Stone*
ATTORNEY.

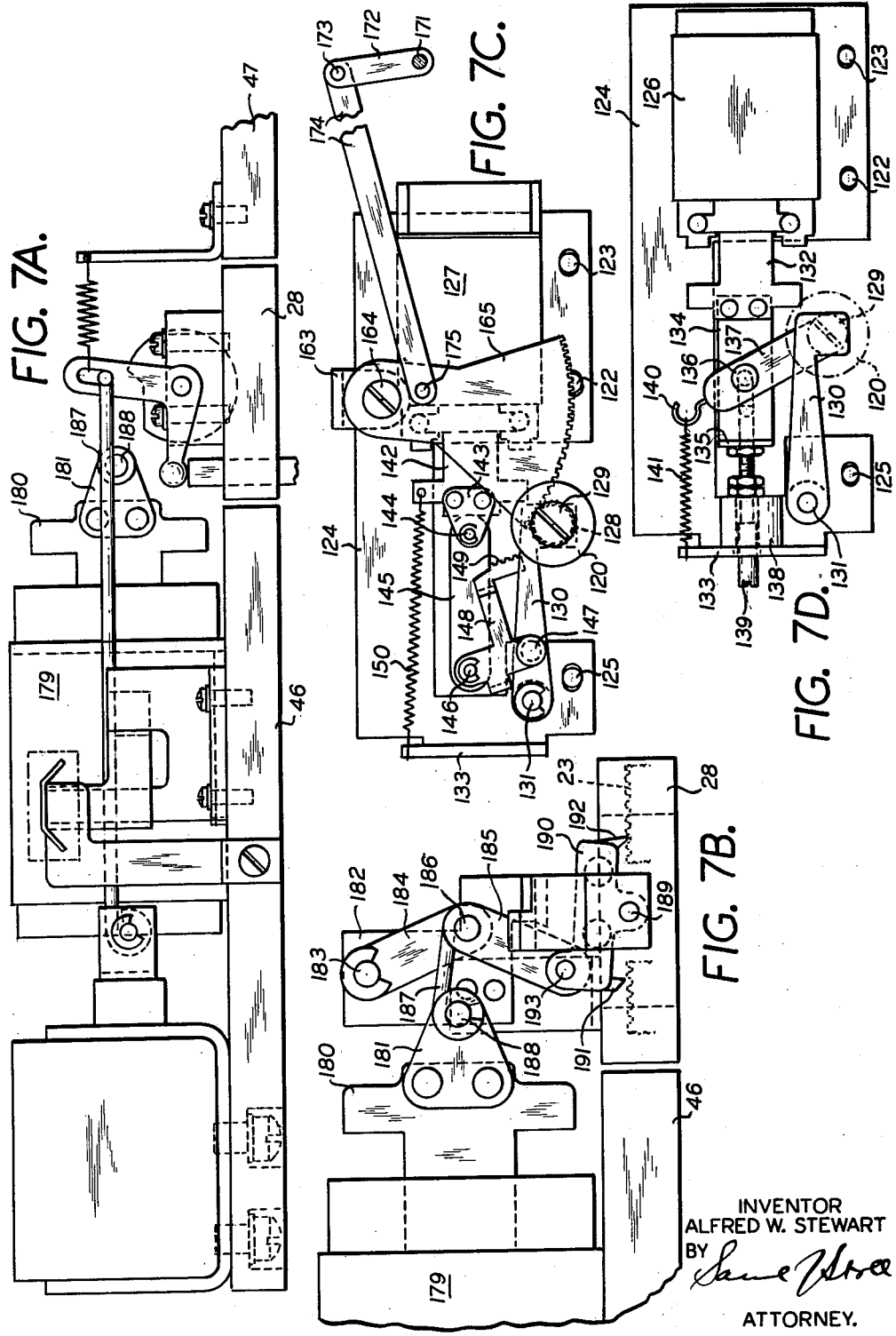

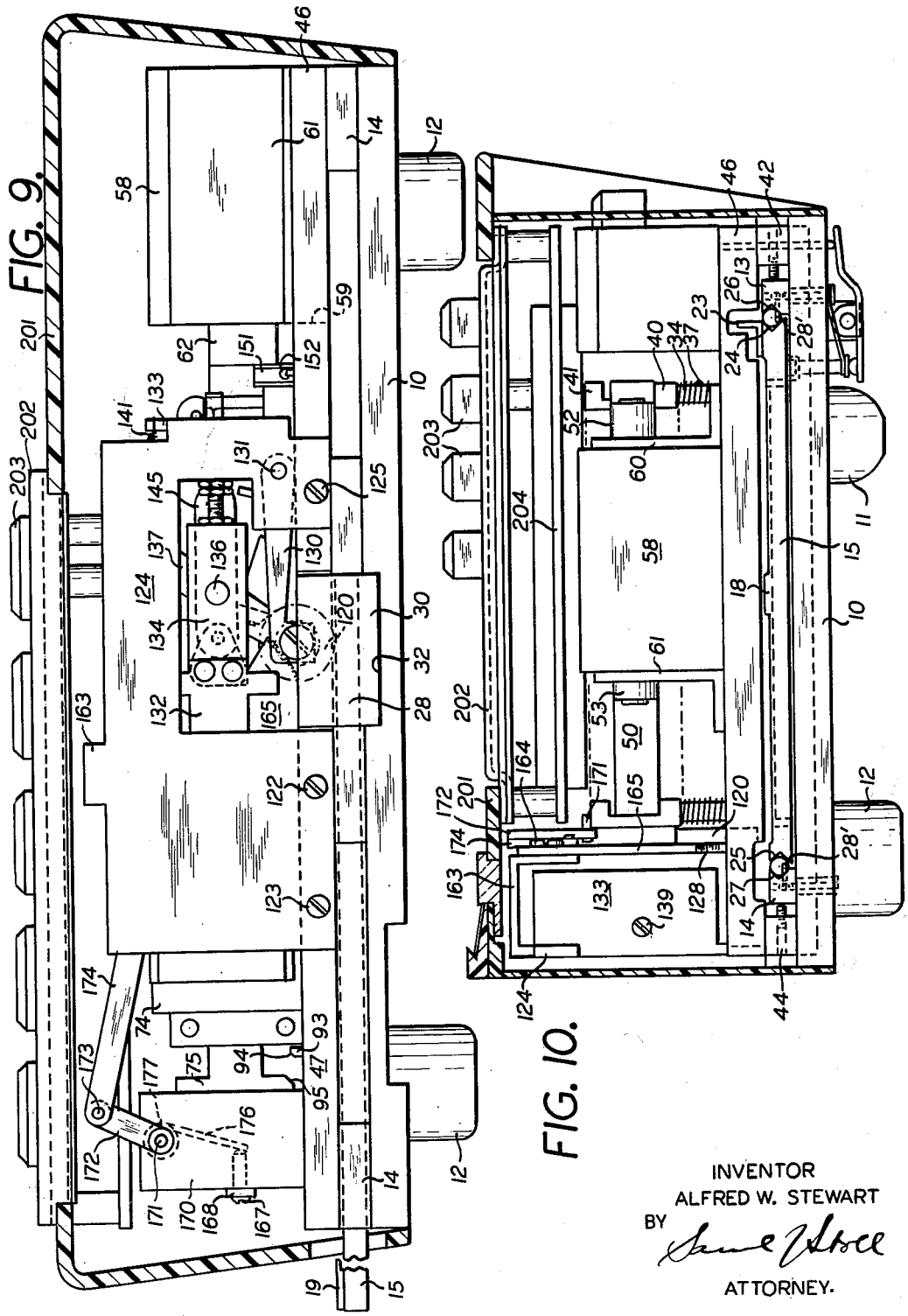

April 14, 1964 A. W. STEWART 3,128,943
CODING MACHINE
Filed July 10, 1961 11 Sheets-Sheet 8
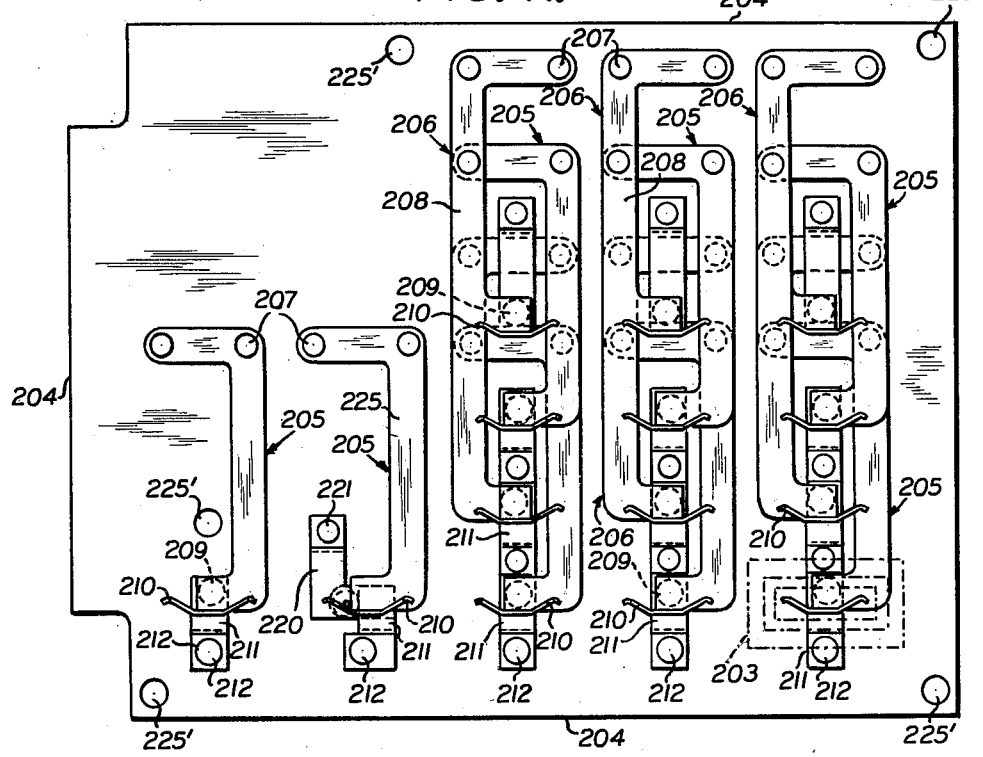
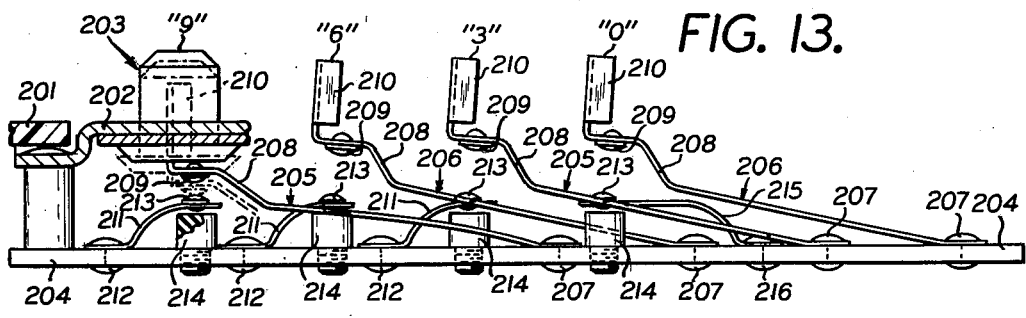
INVENTOR
ALFRED W. STEWART
BY
ATTORNEY.

April 14, 1964     A. W. STEWART     3,128,943
CODING MACHINE

Filed July 10, 1961                 11 Sheets-Sheet 9

INVENTOR
ALFRED W. STEWART
BY

ATTORNEY.

April 14, 1964 A. W. STEWART 3,128,943
CODING MACHINE

Filed July 10, 1961 11 Sheets-Sheet 10

INVENTOR
ALFRED W. STEWART
BY
ATTORNEY.

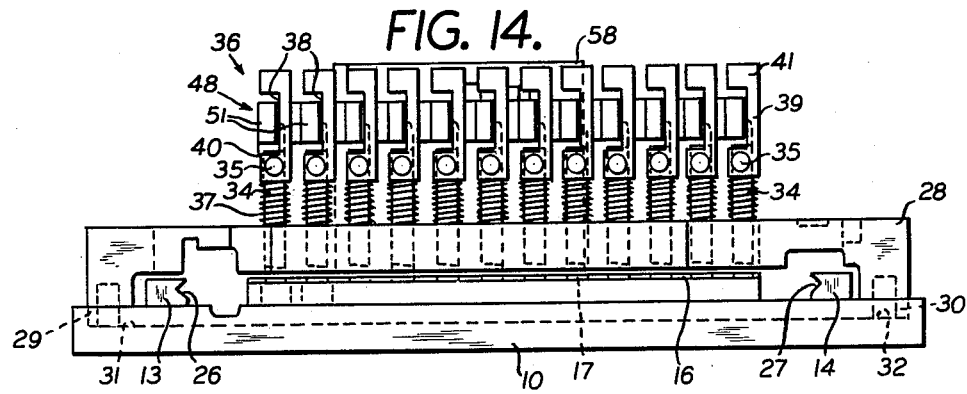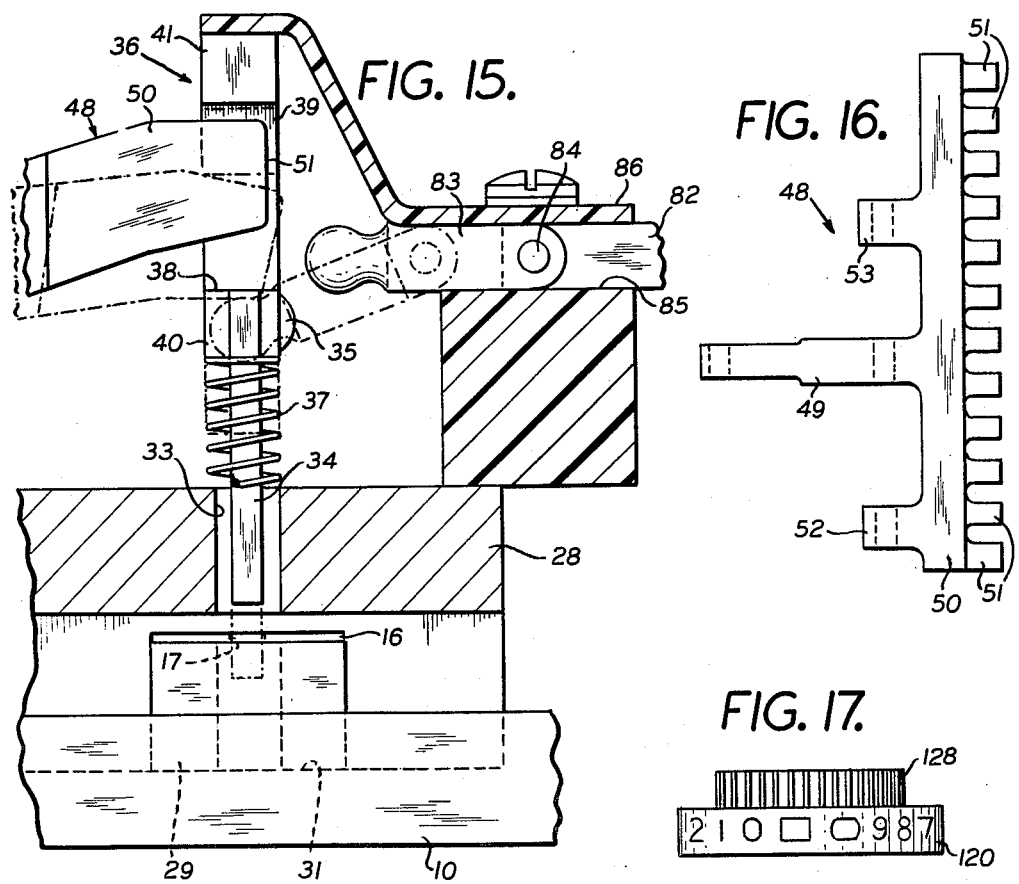

United States Patent Office 3,128,943
Patented Apr. 14, 1964

3,128,943
CODING MACHINE
Alfred W. Stewart, New Paltz, N.Y., assignor to Varifab Incorporated, High Falls, N.Y.
Filed July 10, 1961, Ser. No. 122,883
6 Claims. (Cl. 234—37)

This invention relates to coding machines of the type that transfer data to cards in terms of holes punched therein in particular locations.

The general object of the invention is to provide a novel and relatively simple, inexpensive, small light-weight, and portable machine of this type.

Coding machines of this class known heretofore are generally excessively complex, costly, large, heavy, and difficult to move about. In mechanized bookkeeping and accounting practice and statistical work such coders are usually referred to as "key punch" machines. Actually, the machines, like the machine of the present invention, comprise a key board of labeled push buttons and, ordinarily, electromechanical mechanism adapted to punch holes in the card in locations predetermined by an operator's pressing of particular buttons. The coded cards can be subsequently decoded, or "read," by another type of machine with which the present invention is not concerned.

While the art is not limited to any particular size or shape of card or hole, the cards, particularly, have tended to become standardized; and the holes are generally rectangular rather than round.

As the present invention contemplates, in one embodiment thereof, a machine adapted to handle the standard card in the usual way—insofar as results are concerned—and as the standard card and the usual way of coding it are of first importance to an understanding of the present invention, the card and the results of coding it are herewith described.

The standard card is seven and three-eighths (7⅜) inches long, three and one-quarter (3¼) inches wide, or high, and seven thousandths (.007) of an inch in thickness. The card is fairly rigid and may be peripherally supported flat-wise without sagging in the midportion—an important quality, since nothing may be present beneath the card in its midportion to impede the punching of a hole anywhere therein. The general purpose card is printed on its "face" (the surface disposed upward during a coding operation) usually with equally spaced longitudinal rows of equally spaced digits, with a row of zeros at the top—but nearly three-quarters (¾) of an inch from the top edge of the card—followed in descending order by rows of ones, twos, threes, fours, fives, sixes, sevens, eights, and nines. The digits of each row, being equally spaced, are in precise vertical register, so that the card carries from left to right an equally spaced series of columns of digits, each column reading, of course, from top to bottom, zero, one, two, three, four, five, six, seven, eight, nine. Usually the card has eighty columns, serially numbered in small type. The column serially numbered "1" is the leftmost with respect to the face of the card, and its centerline is a standard distance from the left edge of the card. And, if the number of columns is eighty, the centerline of the eightieth column is equally distant from the right edge of the card. The direction of travel of the card through a coder or decoder is to the left with respect to the face of the card. To indicate to an operator the proper orientation of a card being introduced into a coder or decoder a small portion of the upper righthand corner of the face of the card is diagonally cut away. The digits printed on the card mark particular locations where holes may be punched, and, of course, the general distribution of punched holes constitutes the medium by which coded data is "read" by the decoder.

A group of columns is called a "field." Special purpose cards have printed matter above the "zero" row of digits, with single columns, or fields, or both, marked off and labeled (usually with some symbol or abbreviation) to indicate particular categories of data.

It is common practice in the art for the coding machine to imprint a symbol—usually the digit itself—on the card at the top of a column when a digit of the column is punched out.

Also, it is sometimes desirable to skip columns, or, to use an expression ancient particularly in the typewriter art, to "tab." All coders are provided with tabbing mechanisms which cannot, of course, form any part of their inventive features.

The machine of the present invention is not limited to any particular size or shape of card or hole, as has been previously inferred, but any single modification of the invention would be so limited. For this reason, and in view of the standardization of the key punch machine tabulation card and the preponderant use of a rectangular hole, the embodiment of the invention selected herein as exemplary is designed to effect a processing of a standard eighty-column, twelve-row tabulation card equal to that possible by the most comprehensive coder heretofore known, and to code by means of the common rectangular hole.

Ordinarily considerations of size and weight are immaterial to patent practice; but it is pointed out that two extremely novel and important objects of the present invention are to provide a coder of such small size and little weight as to be much more easily portable than the average portable typewriter. The value of this new advantage will be immediately recognized by those versed in the art.

The present invention contemplates, in the embodiment described and illustrated herein, a coder measuring about eight inches from left to right, except when its tabulation card tray is at its initial position and projects about three inches from the machine's left side, and when the tray is at its final position and projects about the same distance from the machine's right side, so that the longitudinal space required by the machine is about fourteen inches, and measuring about five inches from front to back, and standing about three inches high. The machine weighs about four pounds. It has been said that the present machine is electromechanical. Thus the coder may be conveniently carried about from office to tool room, parts storage room, warehouse, machine shop, or other place having a source of current and where use of the machine is desirable; and, of course, the machine may be placed for operation upon any level surface, such as the top of a desk or table, and will occupy quite a small area of such surface.

The size of the coder having been made known, it will be obvious that another object of the invention is to provide an exceedingly compact key punch machine.

Another object of the invention is to provide a key punch machine having a plurality of punches each of which is driven by a common electromotive device, and means controllable by the operator for selecting which one of the punches such device shall drive in a punching operation, whereby separate driving mechanisms for each punch are obviated. In view of this particular object of the invention it will be apparent that a further object is to provide a coder of relatively simple electromechanical construction.

These and other objects, features, and advantages of the invention will be more fully understood from the following text and from the drawing, the figures of which are listed and briefly described below.

FIG. 1 is a top plan view of the machine as it appears when ready to begin a coding operation. In this figure the tabulation card tray is shown in its initial position with respect to the machine and extending nearly half its length to the lefthand side of the latter. Also in this figure a tabulation card is seen resting in the tray. The card (with no printed matter shown on it) is labeled and indicated by an arrow pointing to its upper righthand corner which is commonly cut diagonally, as shown, to indicate to the operator the proper orientation of the card in any coding machine. It is of first importance herein that it be understood that all directional words relating to the machine or its parts accord with the fact that the front side of the machine, which is the side that normally faces the operator, is the bottom in this figure. In short, the senses of "right" and "left" with respect to the tabulation card and to the operator are necessarily diametrically opposed herein with respect to the machine.

FIG. 2 is an outline top plan view of the standard tabulation card which the machine is designed to handle, the card being drawn on the scale of FIG. 1 for the purpose of comparison with the machine.

FIG. 3 is a much enlarged fragmentary top plan view of the righthand upper corner of the card of FIG. 2, showing a sample of the usual printed matter, two figures printed by the machine, and two corresponding code holes punched by the machine.

FIG. 4 is the circuit diagram of the machine.

All following figures are illustrative of parts of the machine, and generally are drawn on a common scale somewhat larger than that of FIG. 1. A few detail views of parts are drawn on an even larger scale.

FIG. 5 is a top plan view of the machine stripped of its hood, key board, key board switching and printed circuit panel, and various electrical connections which are amply indicated in the circuit diagram of FIG. 4 (all subsequently described). In this figure the tabulation card tray is shown empty and in its initial position ready for a coding operation, as in FIG. 1; but, as the scale of this figure is greater than that of FIG. 1, it has been necessary to break and erase the tray in part.

Figure 6:
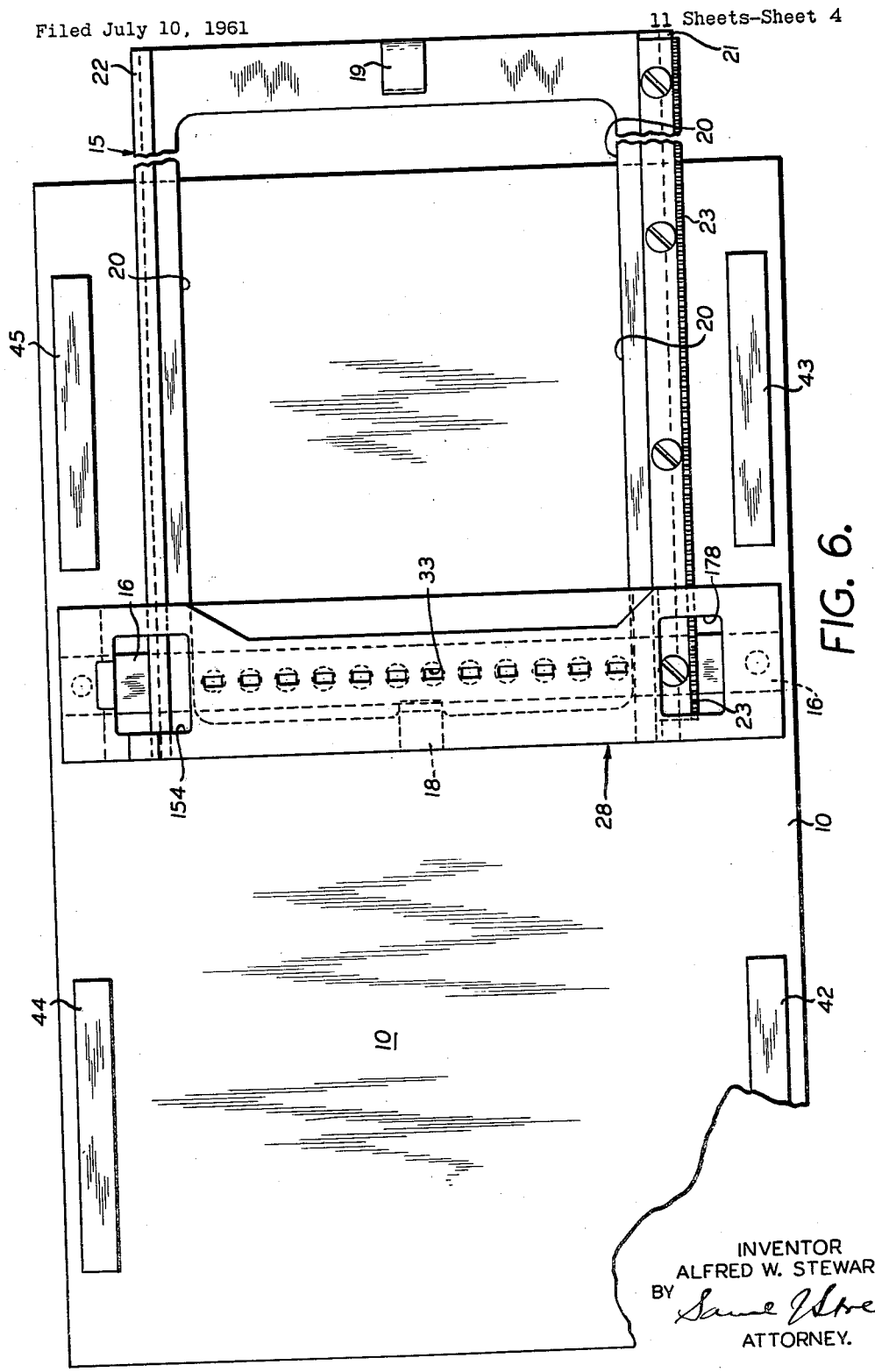

FIG. 6 is a top view of the main frame or base of the machine stripped of all mechanism and mechanism supports seen in FIG. 5, except the tray, which is shown in the same position, and is partly broken and erased, as in FIG. 5; and also included in FIG. 6 are the die block (barely visible) and the punch guide (both attached to the base and subsequently described).

FIG. 7 is a front elevational view of the machine with the front of the hood cut away and the rest of it in section. In this figure, as in FIGS. 5 and 6, the tabulation card tray is shown in its initial position, and, due to the scale of the figure, is partly broken and erased.

FIG. 7A is a fragmentary side view of the punch mechanism.

FIG. 7B is an enlarged fragmentary view of the spacing toggle actuated by the solenoid shown in FIG. 7A.

FIG. 7C is a fragmentary view showing the positioning solenoid and the mechanism connected thereto and operated thereby.

FIG. 7D is a view of the printing solenoid and some of the mechanism connected thereto and operated thereby.

FIG. 8 is a left elevational view of the machine with the left of the hood cut away and the rest in section. The left end of the tabulation card tray is visible in this figure, and, if the figure were photographic, the end of the tray would project into the foreground.

FIG. 9 is a rear elevational view of the machine with the rear of the hood cut away and the rest of it in section. In this figure, as in FIGS. 5, 6, and 7, the tabulation card tray is shown in its initial position, and, due to the scale of the figure, is partly broken and erased.

FIG. 10 is a right elevational view of the machine with the right of the hood cut away and the rest in section. The right end of the tabulation tray is visible in this figure, and its location is nearly halfway into the machine.

For reasons of clarity, in FIGS. 7, 8, 9, and 10, various electrical connections clearly indicated in the circuit diagram of FIG. 4 are omitted.

FIG. 11 is a top plan view of the printed circuit panel and the switches mounted there—the face plate of the keyboard shown in FIG. 1 being removed. All push buttons are also necessarily removed; but the outline of one push button, being that labeled "9" in FIG. 1, in indicated in dotted lines.

Figure 11A:
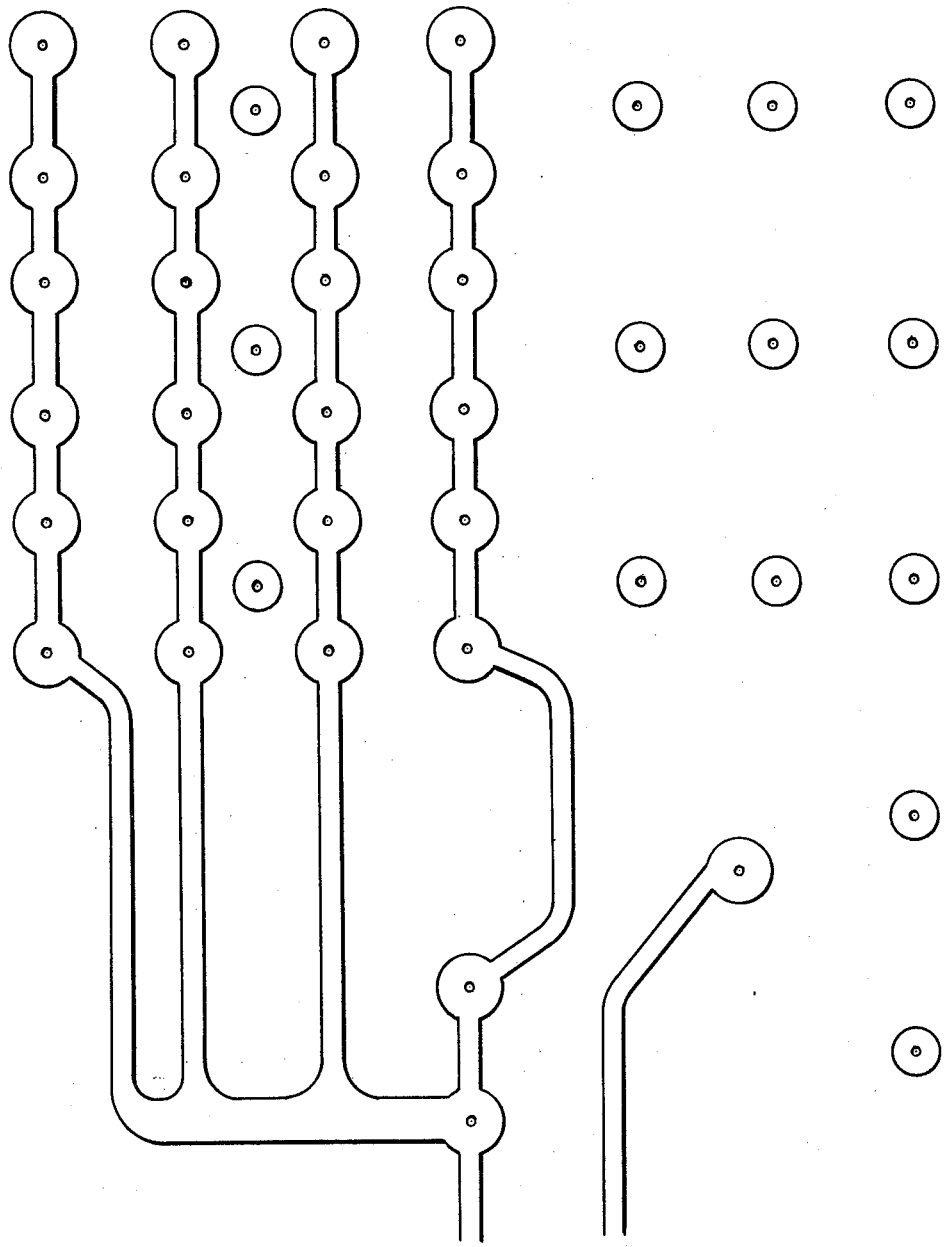

FIG. 11A is another top plan view of the printed circuit.

Figure 12:
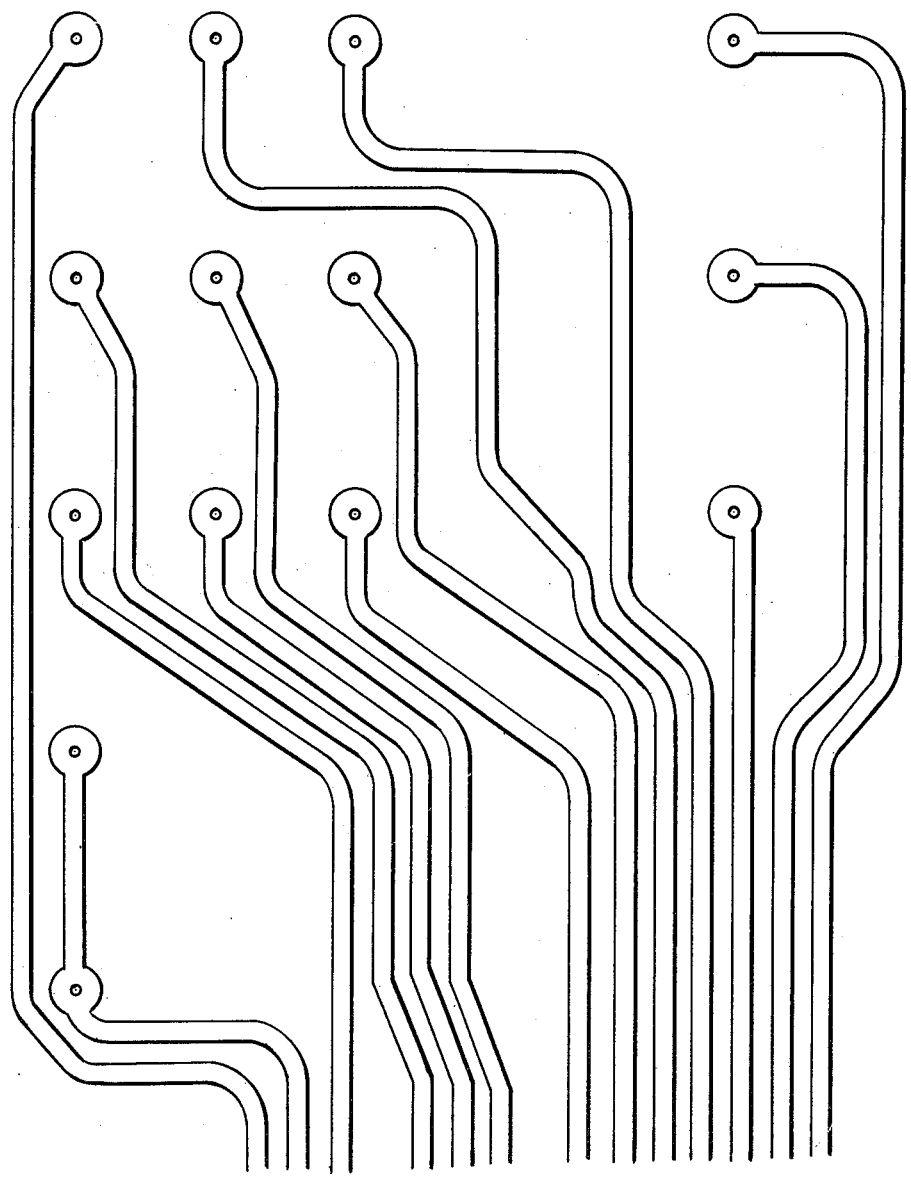

FIG. 12 is a bottom plan view of the printed circuit panel.

FIG. 13 is an enlarged left elevational view showing, partly in section, the construction, and, in dotted lines, the operation, of a typical key board push button and its switch—the push button selected being that labeled "9" in FIG. 1.

FIG. 14 is a left elevational view of the base plate of the machine, the tray guide rails, the die blocks, the punch guide, the punches, the punch retractile springs, the punch superstructures, the punch striker lever, part of the linkage connecting the lever with the armature of the punch solenoid, and an outline of the punch solenoid—all other parts of the machine being removed.

FIG. 15 is an enlarged, fragmentary front elevational view of a typical punch, being the frontmost punch of the machine, showing part of the base plate, the die block, the punch guide partly in section, the retractile spring of the punch, the punch superstructure, part of the punch striker lever, part of the related interposing device, the guide for the interposing devices in section, and the cowling attached to the top of the lastnamed element and extending over the punch superstructure in section, with all moving parts drawn in solid lines in their normal positions and in dotted lines in their positions of greatest displacement.

FIG. 16 is a separate plan view of the punch striker lever.

FIG. 17 is a peripheral view of the printing wheel.

*Description of the Machine*

The machine of the present invention, in the embodiment described and illustrated herein—an electromechanical coder designed to handle the standard eighty-column twelve-row key punch machine tabulation card—is provided with a key board of push buttons and a receptacle for the card sufficiently similar to those of other coders to be immediately comprehensible to an experienced operator. FIG. 1, the description of which should be referred to, is a top plan view of the machine as it appears when ready to be operated. A standard card, which is 7⅜" long by 3¼" wide, or high, is shown in outline in FIG. 2, drawn to the scale of FIG. 1, and a comparison of the two figures will give an immediate fair idea of the size of the machine.

Since the embodiment herein is designed to handle the standard tabulation card as comprehensively as any other coder available, the present machine comprises a twelve-unit punch mechanism, adapted to punch every digit from any column, the punching out of a digit with a replica of the digit; and a key board having an array of fourteen push buttons, ten of which are labeled "0" to "9," inclusive, two of which are arbitrarily labeled "11" and "12," and one labeled "hold," a controlling means for preventing automatic advance of the card after the punching out of a digit, and one labeled "space" which controls mechanism for advancing the card one column each time it is pressed without any punch having operated. The machine, as shown and described herein, is not provided with a tabbing mechanism, since such mechanism forms no part of its inventive features, and, if shown and described, would needlessly complicate the drawing and the specification. However, the machine, as produced for commercial use, will undoubtedly be obliged to be provided with a tabbing mechanism to satisfy demands of convention.

The main frame or base plate 10 of the machine, and the fundamental support of its various components, is a rigid rectangular and fairly thick sheet of any suitable material, but is preferably a hard, tough plastic having excellent machining qualities. This important element is least obscured in FIG. 6, a top plan view; its front, left, rear, and right sides appear respectively in FIGS. 7, 8, 9 and 10. Referring to these last named figures it will be seen that affixed to the underside of base plate 10 are four rubber feet, rectangularly arranged, the two like front feet being designated 11, and the two like and somewhat higher rear feet being indexed 12. The reason for the difference in height between the front and rear feet is so that the machine, when placed in normal manner upon a level surface, will lean slightly toward the operator. Without respect to what convenience this fact may have for the operator, every figure of the drawing which happens to be a pictorial representation of the machine or part thereof has been drawn as if the base plate 10 were disposed absolutely level. Accordingly, figures showing the feet necessarily show the bottoms of those in front slightly higher than the bottoms of those in the rear.

The base plate 10 is a rectangular sheet having a left to right to its front to rear measure of approximately 8:5. Extending from the left end to the right end, and mounted on the upper surface of the base plate, are two rails 13 and 14—the former being toward the front of the base plate, and the latter being toward the rear thereof— which serve as guides for the traveling tabulation card tray, designated 15 (arrows, wherever they appear), and which is more particularly described below. During operation of the machine the tray travels from left to right— carrying the card with it, of course—a distance equal to that between the centerline of the first column of the card and the centerline of the eightieth column thereof. During this travel the tabulation card is carried over the die block 16, which is mounted on the base plate within a premachined channel across the center of the plate. The die block is best seen in FIGS. 14 and 15; in other figures where it appears it is much obscured by other structure; but see its ends in FIGS. 7 and 9, and part of it in plan in FIGS. 5 and 6. The die block 16 is of suitable material, such as tool steel; and it is pierced by a series of twelve spaced like rectangular holes 17, each hole adapted to cooperate with a punch of rectangular cross-section (see below), with the centerline of the series coincident with the transverse centerline of the machine.

The position of the series of holes of the die block is, of course, the coding station of the machine. Therefore, when a tabulation card is placed in the tray 15, with the latter in its initial position (e.g., as in FIG. 1), a considerable portion of the card is inserted into the machine until the leading or lefthand edge of the face of the card engages a spring-loaded clamp 18, shown in normal position in FIG. 6, which is forced by the edge of the card slightly to the machine's right until the righthand edge of the card may drop to rest to the left of the fixed card gage 19 at the left end of the tray. Thus the card is actually lightly clamped in the tray during the machine's operation. The clamp 18 appears only in FIG. 6, but the gage 19 is clearly visible in a number of figures. Also, when the card is placed in the tray with the latter in its initial position, the first column of the card is coincident with the coding station.

The tray 15, best seen in FIG. 6—although part of it appears in many figures—is a rectangular frame having left to right and front to rear dimensions slightly greater than those of the card surrounding a fenestration 20 which the card spans, being peripherally by the tray. The fenestration is of course necessary to avoid any interference with punching holes anywhere within the midportion of the card. The card is firmly held against longitudinal movement in the tray by clamp 18 and gage 19 and against latitudinal movement by a front raised portion 21 of the card and a rear raised portion 22 thereof (see FIG. 8).

On the front upper edge of the tray 15 is a rack 23, preferably of metal suitably affixed to the tray, by means of which a mechanism subsequently to be described advances the tray step by step during operation of the machine. The rack appears in several figures; see, especially FIG. 7.

To facilitate longitudinal movement of the tray relative to the machine, the front and rear sides of the tray are provided with V-shaped channels running from left to right (see FIG. 8). The forward of these channels is indexed 24, the rearward 25. The rear side of guide rail 13 and the front side of guide rail 14 are provided with like V-shaped channels extending from end to end of the rails. Channel 24 of the tray faces the channel 26 in rail 13, and channel 25 of the tray faces the channel 26 in rail 14, and between the two pairs of opposing channels are ball bearings (see FIG. 8). To prevent the ball bearings from rolling beyond the ends of the guide rails 13 and 14, pins 28 are inserted in each end of both rails (FIGS. 6 and 8).

Mounted on the base plate 10 is the punch guide 28, which is literally a unitary bridge, preferably of brass or some other suitable metal, rigidly spanning the base plate from front to back, the die block 16, the guide rails 13 and 14, and the tray 15, and is provided with feet 29 (front; see FIG. 7) and 30 (rear; see FIG. 9) which are respectively secured to the base plate in premachined recesses 31 and 32 (FIGS. 7 and 9). The punch guide is provided with a series of spaced like rectangular holes 33, there being twelve such holes and the series being transverse with respect to the machine with holes 33 registered with holes 17 of die block 16. It will be seen in FIG. 8 that the underside of the span of the guide block 28 is at least several times the thickness of a tabulation card above the top of the die block, and the only object which passes longitudinally between the guide and the block during operation of the machine is the card itself.

As will also be noted in FIG. 8 the underside of the span of the punch guide is milled or otherwise channeled longitudinally with respect to the machine to permit free passage of the more elevated portions of the tray and the rack.

Within each rectangular hole 33 of the punch guide 28 is a punch 34, of suitable hard material such as tool steel, of rectangular cross section, adapted to cooperate with one of the holes 17 of the die block 16. All punches are alike, and, of course, in the present embodiment, there are twelve of them. Each punch is a short bar having a sharp-edged lower end, which may be slightly at a slant. The tolerance between any punch and its guide hole is such that the punch may freely move up and down. Each punch is somewhat more than twice as long as the thickness of the span of the punch guide, and, normally, the greater or upper part of the punch is exposed above the span while the lower part of the punch is within the guide hole 33. The most illustrative figure of the foregoing and immediately following matter is FIG. 15, which is an enlarged detail; but see also FIGS. 5, 7 and 14.

The top end of each punch is rigidly riveted at 35 to an element which is substantially an upward extension of the punch and which is referred to herein as the punch superstructure 36. This element serves as an abutment for the punch compression spring 37, the other abutment being the top of the punch guide. Normally the spring 37 is under practically no compression, and the punch may be said to be "floating" in its guide hole 33. The superstructure 36 is actually the remainder of a short bar of some suitable metal, such as aluminum alloy, of square cross-section. Seen in left elevation, as in FIG. 14, a considerable intermediate notch 38 extending from the front of the element almost three quarters of the thickness of the bar separates and leaves only a relatively thin connecting portion 39 between the lower portion 40 and the upper portion 41. The notch 38 is provided for the purpose of accommodating a tooth of a denticulated punch striker lever described below.

The lower portion 40 of the superstructure 36 is forked, as best shown in FIG. 15; the top end portion of the punch is fitted within the fork, and riveted in that position at 35. The foregoing relates to any punch and its superstructure; each punch 34 and its superstructure 36 move as a unit.

Referring again to FIG. 6, which comprises the most complete plan view of the base plate 10 of the machine, it will be noted that two bars 42 and 43, parallel to and slightly in front of guide rail 13, are mounted on the base plate near the front edge thereof and to the right and to left respectively; and that two other bars 44 and 45, parallel to and slightly to the rear of guide rail 14, are mounted on the base plate near the rear edge thereof and to the right and to the left respectively. All four bars 42, 43, 44, and 45 are of equal height and slightly higher than the rails 13 and 14.

Mounted on bars 42 and 44, to the right of the punch guide, and on bars 43 and 45, to the left of the guide, respectively, are two platforms 46 and 47, both of which may be, and preferably are, rigid sheets of a plastic like that of the base plate 10, and of equal thickness. Much of the mechanism of the machine is mounted upon these two platforms, both of which span rails 13 and 14 and the base plate and permit free travel of tray 15. The platforms 46 and 47 are seen in plan in FIG. 5, much obscured by mechanism mounted upon them, and the platforms are seen in elevation in appropriate figures.

The element provided in the machine for driving any punch 34 through a tabulation card, is referred to herein as the punch striker lever 48. This element, preferably a single piece of machined hard steel, is of unusual design, and for that reason is shown separately in top plan in FIG. 16. The element is seen to be somewhat T-shaped; using typographical terms, those parts of the element corresponding respectively to the "stem" and the "bar" of the T are indexed 49 and 50. The orientation of the punch striker lever 48 in assembly is made immediately clear by reference to FIG. 5. The lefthand side of portion 50 is denticulated, being provided with twelve like teeth 51, or one tooth for each punch. The denticulation is clearly shown in FIG. 16, necessarily partly obscured in the assembly plan of FIG. 5, and seen in left elevation fairly clearly in FIG. 14. Each tooth 51 passes freely through a notch 38 of a punch superstructure 36 (FIG. 14), and the bottom of any tooth, which is registered above the top of a punch, is normally at a slight distance above the top of the punch, as shown in FIGS. 7, 14, and 15. It will presently be shown that the entire range of movement of any tooth 51, as well as of portion 50 of the punch striker lever 48, is from the normal position shown in the three lastnamed figures to the dotted line position of FIG. 15, or, in short, that distance from the normal position of the bottom of any tooth 51 to the normal position of the top of any punch 34. Obviously, then, in the absence of any interposed object between the bottom of a tooth 51 and the top of a punch 34, movement of a tooth cannot affect its related punch.

It will be noted in FIG. 14 that the first eleven connecting portions 39 of the punch superstructures 36 pass between pairs of teeth 51; and the rearmost connecting portion 39 passes to the rear of the twelfth tooth 51, counting from the front.

Portion 50 of the punch striker lever 48 is provided on its right side with two bosses 52 annd 53, between which is portion 49. As seen in FIGS. 5 and 7, the fulcrum of lever 48 is an anterior-posterior shaft 54, which is passed freely through portion 49 and bosses 52 and 53 (which are mainly important to prevent any lateral play of lever 48) and is passed through and locked in bosses 55 and 56 of a bracket 57, which is much obscured in the drawing but is mounted on platform 46 just to the right of the punch guide 28.

The punch striker lever 48 is activated by a solenoid 58—referred to herein as the punch solenoid—through a linkage of levers presently to be described. The punch solenoid 57, the largest and most powerful of a number of solenoids forming part of the machine, is positioned partly within a cutout 59 at the right side of platform 46 (FIGS. 5 and 9) and is supported by and between two brackets 60 and 61 respectively, mounted on platform 46 on the front edge and on the rear edge of the cutout 59. While the coil of solenoid 58 occupies part of the cutout 59 it does not extend downward far enough to interfere with the travel of tray 15.

The armature of solenoid 58 is designated 62, and, seen in plan, as in FIG. 5, is T-shaped. The "stem" of the T is that portion movable within the solenoid; the "bar" serves as a gage and as a mount for a bracket, described presently, which, among other things, is a switch actuator. When the solenoid 58 is energized the armature 62 is drawn to the right until the "bar" strikes the lefthand side of the field pile 63 of the magnet. This not only stops motion of the armature 62 but also movement of the punch striker lever 48.

The linkage through which the armature 62 of solenoid 58 activates the punch striker lever 48 is best illustrated in front elevation in FIG. 7 (it is seen in top plan in FIG. 5, but from a disadvantageous angle).

Within a round-bottomed hole 64 provided in the middle of the lefthand side of the "bar" of armature 62 is a spheroid knob 65 of a short link 66 which extends to the left of the armature. The knob 65 is connected to the lefthand portion of the link 66 by a neck much smaller in cross section than the knob. This structure is much obscured in the drawing and is illustrated in part by dotted lines (FIGS. 5 and 7). Affixed to the lefthand side of the "bar" of armature 62, is the bracket mentioned above, the latter being designated 67. The neck of link 66 passes freely through a hole in bracket 67, but knob 65 is too large to pass through, so the latter is captivated in hole 64 as if it were a ball in a socket. Consequently, link 66 is swivelly connected to armature 62. Other functions of bracket 67 are subsequently described.

Attached to the lefthand or outer end of link 66 is a retractile spring 68 which normally serves to hold armature 62 in the position shown in FIGS. 5 and 7, and to return it to such position after an excitation of solenoid 58. The lefthand end of retractile spring 68 is attached to bracket 57 (FIG. 7).

A small anterior-posterior shaft 69 is passed freely through the line 66 near its lefthand end. Mounted freely on shaft 69 on either side of link 66 are two links 70 which are pivotally connected to portion 49 of the punch striker lever 48 near its righthand end at 71. Also freely mounted on shaft 69 to the front and to the back of links 70 are two other links 72 which are pivotally connected to bracket 57 at 73 (dotted lines, FIG. 7). Upon energization of solenoid 58 armature 62 is drawn to the right a predetermined distance; this action draws link 66 and shaft 69 to the right, and a "lazy-tong" action lefts the righthand end of portion 49 of punch striker lever 48 a predetermined distance, thereby bringing the denticulated portion 50 downward so that the teeth 51 move, with considerable power, from normal position to the dotted-line position of FIG. 15. See below. Incidentally during this operation, retractile spring 68 is stretched, preparatory to returning the armature and its associated parts to normal positions upon completion of an operational cycle of the machine.

Mounted on platform 47 side by side in a series disposed transverse to the longitudinal axis of the machine are twelve like solenoids 74, referred to herein as the interposer solenoids. These solenoids are quite thin from front to back, and the whole close-packed series is just about as long as the series of punches 34 and the series of teeth 51 of position 50 of the punch striker lever 48.

While all solenoids are alike, structural details are fully shown only for the frontmost of the series. See FIGS. 5 and 7. The description following with respect to the frontmost solenoid and parts associated with it is, in the main, valid with respect to any of the other eleven magnets and their associated parts. For reasons of limiting lateral space in the machine, the solenoids 74 are much higher than their front-to-back thickness. Their armatures move horizontally. The armature of any solenoid 74 is designated 75, and, seen in elevation (FIG. 7), appears T-shaped. The "bar" of the T is a gage to limit throw of the armature.

Attached in any suitable manner to the lefthand end of each armature 75 is a yoke 76 (FIG. 5) which is coupled to a lever 77. The latter is pivoted at 78 (FIG. 5) and it and the yoke and the armature are normally held in the retracted position of FIGS. 5 and 7 by a spring 79 which is attached both to the lever 77 and to a bracket 80 mounted near the lefthand edge of platform 47.

A pin 81 connects the righthand end of the armature 75 with a composite device for interposing a substantially incompressible, net pivotally movable, element between a tooth 51 and its related punch 34. Shown in enlarged detail in FIG. 15; also seen, partly in dotted lines, in FIGS. 5 and 7. If energization of solenoid 58 takes place while such an element is so interposed, consequent rocking of the punch striker lever 48 causes the particular tooth 51 to drive its related punch 34 through the agency of the element, as illustrated in dotted lines in FIG. 15. It will be shown later that only one solenoid 74 can be energized at a time, so that only one armature 75 and associated interposing device will then be moved, to the end that only one of the twelve punches will operate.

The composite device mentioned above comprises a short bar 82 to which pin 81 is directly connected, and the above mentioned element 83, which is hingedly connected to bar 82 at the right end of the latter at 84, and the right end of element 83 is rounded and shaped to fit between a tooth 51 and a punch 34 and also to rotate slightly therebetween during an operation of the punch striker lever 48. Both bar 82 and element 83 of the interposing device are normally supported within a channel 85 provided in the upper part of a block 86, mounted transversely on platform 47. The interposing device is slidable within the channel 85. It will be understood that there are twelve each of the solenoids 74, armatures 75, pins 81, interposing devices, and channels 85 in block 86.

The righthand end of each pin 81 is provided with a head 87 of slightly greater cross-section than that of the rest of the pin. The lefthand end of each bar 82 is provided with a forked coupling 88 through which the shank of the pin 81 may pass freely but through the head 87 of the pin may not pass. A slight amount of free space is provided between the coupling 88 and the actual lefthand end 89 of the bar 82 so that a small amount of play is possible between the pin 81 and bar 82. The reason for this is explained subsequently.

Plainly the energization of any solenoid 74 must precede that of solenoid 58 so that the rounded righthand end of element 82 is in place between a tooth 51 and its related punch 34 before the punch striker lever 48 begins to move. (Selective energization of solenoids 74 is described subsequently.) Upon energization of a solenoid 74 its T-shaped armature 75 (see FIG. 7) moves to the right; when the armature is nearly as far into the coil of the solenoid as it may go the rounded end of element 82 is practically within its rightmost position between a tooth 51 and a punch 34; all of element 82 will be out of channel 85, and upon operation of lever 48 element 82 will be able to pivot at 84 (see FIG. 15); and at this time solenoid 58 is energized by the following means.

Shown only in dotted lines in FIGS. 5 and 7 is a lever 90, pivoted at 91 on a bracket 92 mounted on the lefthand side of block 86 just to the rear of the middle of the block. At the lefthand end of lever 90 there is rigidly fixed, as by soldering, a bar 93, transversely disposed and passed beneath all armatures 75. The lever 90 is springloaded so that the bar 93 is normally slightly elevated as seen in dotted lines in FIG. 7. The upper lefthand side of bar 93 is provided with a cam face at 94, and the lower righthand corner of each "bar" of an armature 75 is also provided with a cam face at 95, so that the last portion of the movement to the right of any armature 75 depresses the lefthand end of lever 90 and closes a microswitch 96 mounted in a recess of platform 47 near the righthand end of the lever. Closing of microswitch 96 effects energization of the punch solenoid 58 and actuation of the punch striker lever 48, bringing one of the teeth 51 down against an interposing element 83 and operating one of the twelve punches 34.

Notice, in dotted lines in FIG. 15, the pivotal displacement of an element 83 when its related punch is in operation.

The printing mechanism is mounted on the rear edge of the machine (which corresponds to the top of the tabulation card in process of being coded) partly on both platforms 46 and 47 and bridging in part the rear portion of the guide block, which will be shown to be provided with a fenestration so that the printing operation may take place therethrough in register with the coding station.

A general analysis of the printing mechanism here precedes a detailed description of its various parts so that the problem which it solves may be fully understood.

The particular construction of machine selected for description and illustration herein as exemplary of the invention is adapted, as has been shown, to punch any of twelve holes in each column of the tabulation card; and it is desired that an impression be made at the top of the column, signifying in letter-press, the digit or particular significance of the hole punched out, and that such impression be made substantially with the punching operation. It has been said that the commonest operation of the machine is simply to punch out a digit of a column, imprint a replica of the digit at the top of the column, and then automatically to advance the card one column.

In accordance with the foregoing the machine must be able to imprint any one of ten digits and either of two symbols, as twelve different leter-press characters. Thus two elements of first importance in the printing mechanism assembly are the printing wheel 120 (best seen in FIG. 5; see also FIG. 9) and the inking cartridge 121 (best seen in FIG. 5). The system of printing, herein employed, is to stamp the impression with a character cut on the peripheral surface of the wheel directly onto the card, but not through a ribbon, as is common in this and kindred arts; the system involves two steps, first the literal inking of the character to be impressed, and then the stamping with the character as in ordinary letter-press practice, but novel in this art. The actual inking of the desired character is performed by the inking cartridge, which is a reservoir of ink headed with an inking pad adapted to be brought into momentary contact with a character of the wheel just before the wheel is rotated to bring the character over the card and the entire wheel is stamped down upon the card, leaving the ink film of the freshly inked character thereon.

Since the printing characters are cut upon the peripheral surface of a wheel, and the number of different characters is twelve, the characters are obviously most conveniently placed at intervals of 30°. The characters are too small to be shown in the top plan view of FIG. 5, and would be obscured in the rear elevational view of FIG. 9; but an enlargement of the print wheel, seen edgewise, is had in FIG. 17, wherein the wheel is separate from other parts, and wherein two exemplary symbols, relating to the non-digital punch holes, and parts of digits may be seen. The printing wheel and its characters are more specifically described subsequently.

According to the arrangement of the key board of the machine the push buttons that actuate punches are labeled from "0" to "9," and then "11" and "12," or, in serial order, from what amounts to from one to twelve; and this order is adopted in cutting the characters on the periphery of the print wheel 120—it will subsequently be shown how the pressing of any figured push button causes the print wheel to rotate immediately to a corresponding angular position. The following is a detailed description of the printing mechanism itself.

Mounted on the rear edge of platform 47 by screws 122 and 123 is a bracket 124 which extends to the right beyond the rear end of the punch guide 28 and is anchored again by a screw 125 engaging platform 46 (see, particularly, FIG. 9; also FIG. 5). The bracket 124 serves to support all the printing mechanism of the machine except the inking cartridge and its mechanism (see below).

Mounted side by side to and near the left of bracket 124 at the front thereof are two extremely thin solenoids (best seen in FIG. 5)—the printing solenoid 126, to the rear and next adjacent the bracket 124, and the solenoid 127, referred to herein as the positioning solenoid, as its function is to rotate the printing wheel exactly 90° after an impression character thereof has been inked (by horizontal motion) by the inking cartridge 121, so that when the printing solenoid is energized the freshly inked character will be at the bottommost portion of the periphery of the wheel in order to strike the tabulation card.

The printing wheel 120 as will be seen in FIGS. 5 and 17, as well as in FIG. 9, is made integral in any suitable manner with a coaxial and smaller pinion 128, which is directly behind, and, of course rotates with the wheel. The printing wheel and its pinion are rotatably mounted by a shoulder screw 129 (FIG. 7) at the outer or left hand end of a cantilever 130 pivotally mounted on the front of bracket 124 at the right at 131. Normally the cantilever is disposed substantially horizontally with the print wheel raised a slight distance above the level of the top of a tabulation card being processed. See FIG. 9.

The armature of solenoid 126 is designated 132 and when the solenoid is energized the armature is drawn toward the left. Seen in elevation, best in FIG. 9, disadvantageously in FIG. 5, and obscured in FIG. 7, this armature of the printing solenoid 126 is somewhat T-shaped. A portion 133 of bracket 124, at its right end, is bent forward. Armature 132 is provided with a rigid extension to the right which is seen best in FIG. 5 and is designated 134; the right hand end of extension 134 is bent forward to provide an ear 135. Pivotally mounted at 136 to extension 134 and also to the outer or left hand end of cantilever 130 coaxially with the printing wheel 120 is a connecting link 137. FIG. 9. Affixed in any suitable manner to the left hand side of forwardly bent portion 133 of bracket 124 is a block 138. An adjustment screw 139 is passed horizontally through the portion 133, block 138, and ear 135 of extension 134, and is provided between the block and ear, in usual manner with lock nuts (not indexed); the purpose of the screw 139 is to act as a stop for connecting link 137, and therefore as a gage for limiting and regulating movement up and down to cantilever 130 and the printing wheel 120. Seen partly in dotted lines in both FIGS. 5 and 9; largely obscured in FIG. 7. At the upper end of connecting link 137 is a hook 140. A retractile spring 141 connects the hook 140 with the portion 133 of bracket 124 and holds the connecting link 137 against the left hand end of the adjustment screw 139, and thereby holds the armature 133 of the printing solenoid 126 and the printing wheel 120 and its cantilever 130 in normal or inoperative position.

The armature of the positioning solenoid 127 is designated 142, and when this solenoid is energized the armature is drawn toward the left, like armature 132 of the printing solenoid 126. Seen in elevation (although it can only be seen in the plan view of FIG. 5; see FIG. 9, wherein part of the immediately following matter is indicated in dotted lines, and FIG. 7 wherein a small portion of such matter is not obscured), the armature of the positioning solenoid is also somewhat T-shaped. The righthand, or outer end of armature 142 is provided with a rigid triangular extension 143 (FIG. 9), and pivotally connected to this extension at 144 is a connecting link 145, extending to the right. Pivotally connected to the link 145 near its righthand end at 146 and also pivotally connected to the cantilever 130 at 147 is an element 148, seen in FIG. 7 to be roughly T-shaped. What would be called in typographical parlance the "stem" of the T is provided at its extremity with a gear sector 149, which is adapted to mesh with the pinion of the printing wheel, but which is normally disengaged from it.

The system of interconnecting and pivotally joined parts involving connecting link 148, the somewhat T-shaped element 148, and the cantilever 130 is so designed with respect to the predetermined throw of the armature 142 of the positioning solenoid 127, that, upon energization of such solenoid, the gear sector 149 meshes with pinion 128 of the printing wheel 120 and rotates it exactly 90°. A retractile spring 150 connects armature 142 and portion 133 of bracket 124 and normally maintains the armature and various parts associated with it in the positions shown in FIG. 5. For reference, this action follows an inking operation of a character of the printing wheel and precedes a stamping operation, since the former is performed horizontally and the latter substantially vertically.

With particular reference to FIG. 5 it will be seen to the rear and slightly to the left of the punch solenoid 58, and mounted on the platform 46, there is an ink cartridge holder 151 for the cartridge 121 (mentioned before). The holder and cartridge are registered with the printing wheel 120 and slightly to the right of it, and are adapted to reciprocate longitudinally. The holder is maintained in the normal position shown by a retractile spring 152. The cartridge is a container or reservoir of suitable print-ink; and the lefthand end of the cartridge is plugged by a porous inking pad 153, which is kept saturated by the ink within the cartridges. The operation of inking a character on the periphery of the printing wheel is literally to kick the ink cartridge toward the wheel so that the pad deposits a film of ink on the character in line with the cartridge. As will be more fully understood from a description of the operation of the machine, which follows the general description of its structure, almost immediately after the inking operation, and in this order, the gear sector 149 effects a 90° rotation counterclockwise (looking from the front) of the pinion 128, and therefore of the printing wheel 120, carrying the freshly inked character to the lowermost position of the periphery of the wheel, and the connecting link 137, due to energization of the printing solenoid 126, causes cantilever 130 with the printing wheel near its lefthand end to descend smartly, stamping the inked character against the tabulation card.

It will have been seen in FIG. 5 that the rear end portion of the punch guide 28 is fenestrated at 154 to accommodate the printing wheel and associated parts. For reference, the rack of tray 15 is toward the front of the machine.

It has been found that this method of direct letterpress printing is far less complicated than the customary printing through a ribbon which must be advanced step by step after impressions and from time to time rewound.

The means provided for kicking the ink cartridge holder 151 and cartridge 120 to snap the inking pad 153 against a character of the printing wheel is next described.

Affixed in suitable manner to the lefthand side of the

"bar" of the armature 62 of the punch solenoid 58 is, as has been mentioned above, the bracket 67, which has several functions. The bracket 67, at its rear portion, is bent horizontally to form a longitudinally disposed arm 155. Pivotally connected to arm 155 near its outer or lefthand end is a lever 156 which is pivotally supported by any suitable means mounted on platform 46 at 157 so that it may rock in a horizontal plane in accordance with movement of bracket 67 which is attached to armature 62. Near that end of lever 156 directed toward the ink cartridge holder 151 is a dog 158 pivoted to the lever at 159 and normally maintained against a stop pin 160 by a spring 161. It will be noticed that an ear 162 projects forward from the ink cartridge holder normally in the path of dog 158, the righthand side of which is beveled.

Upon energization of the punch solenoid 58, armature 62, bracket 67 and arm 155 are snapped sharply to the right. This action triggers lever 156 so that the dog 158 literally kicks the ear 162, the holder 151, and the ink cartridge 121 to the left, slapping the saturated ink pad 153 against whatever character of the printing wheel happens to be within its path. Even before the whole leftward movement of the ink cartridge has taken place the dog 158 slips out of engagement with the ear 162. After the inking operation the retractile spring 152 draws the ink cartridge holder back to normal position. The reciprocation of the ink cartridge holder takes but a fraction of a second. However, the punch solenoid remain energized for a slightly longer period. This does not interfere with the return of the ink cartridge holder to normal position because the dog 158 remains out of the path of the ear 162. When the punch solenoid 58 is deenergized and lever 156 returns to normal position (due to the action of the retractile spring 68 of the armature 62), it simply flips past ear 162 due to spring 161.

The bracket 124 is, for the most part, a vertically disposed member, the lower portion of which is secured to the rear sides, respectively, of platform 47 at 122 and 123 and platform 46 at 125 (see FIG. 9). From the upper edge of bracket 124 (FIGS. 5, 7, and 9, compared, are most illustrative), near the righthand ends of the printing solenoid 126 and the positioning solenoid 127, an ear 163 is bent forward, above and beyond both solenoids, and, slightly in front of the positioning solenoid, is bent downward 90°, and provides a pivotal mount at 164 for a vertically disposed gear sector 165 (FIG. 5; much obscured in FIG. 7; seen partly in dotted lines in FIG. 9), which is always in mesh with pinion 128 of the printing wheel 120. The effective radius of the gear sector 165 is so much greater than that of pinion 128 that a relatively small angular movement of the gear sector— say arbitrarily 30°—is sufficient to turn the little pinion through one complete revolution, and, of course, to change the angular disposition of any character of the printing wheel through a full cycle, bringing the character back to its normal position.

In the present construction, as has been described above, the printing wheel 120 bears peripherally twelve evenly spaced characters, so that, of course, the centers of adjacent characters are exactly 30° apart. The characters are in relief, like the letters and figures on the striking arms of a typewriter. The purpose of the gear sector 165 is operatively to position, upon energization of an interposer solenoid 74, the character to which that particular solenoid relates so that it is angularly disposed to face the pad 153 of the inking cartridge. The means by which operation of an armature 75 of an interposer solenoid effects a specific angular change in gear sector 165 from its normal position (FIG. 9) is presently described; but it should first be pointed out that the construction of the present embodiment is by no means in limitation of the invention, and has been influenced heavily by the arrangement of printed matter on the standard tabulation card so carefully described in the preamble.

Since the lowest printed digit row on the card is "9" and the topmost printed digit row is "0," and either of two spaced holes may, when specially desired, be punched above the topmost printed row, and, further, that in labeling the push buttons of the key board of the present machine the button corresponding to the aforementioned spaced hole next above the zero row is designated "11" and the button corresponding to the next higher spaced hole is designated "12"—which is quite arbitrary, since any two symbols would have served equally well for "11" and "12" (these figures not being characters on the printing wheel because, in overprinting, either would obscure somewhat the priorly printed digit)—the frontmost interposer solenoid, armature, interposing device, and punch (FIGS. 5 and 7) necessarily correspond to push button labeled "9" and to the "9" digit row at the bottom of the card; the next solenoid, armature, device, and punch relate to push button labeled "8" and to the "8," or next-from bottom, digit row of the card; and so on. Therefore, the order of characters on the periphery of the printing wheel must be "9," "8," "7," "6," "5," "4," "3," "2," "1," "0," "11," "12," or the exact reverse. It will be shown herein that the printing wheel rotates counterclockwise, seen from the front, both when its pinion 128 is driven from normal position to bring an appropriate character opposite the pad 153 of the "inking" cartridge, and when the pinion is further driven 90° by gear sector 148 to bring the inked character into bottommost or printing position. But the above mentioned means by which operation of an armature 75 of an interposer solenoid effects a specific angular change in gear sector 165 from its normal position may be the exact reverse of what is presently described, so that neither the order of the characters quoted above or the arrangement of the presently described means is critical, since the order and the arrangement would work just as well if both were reversed.

Further, that character normally opposite the pad of the inking cartridge, if the quoted order be employed, as assumed in the drawing, (see FIG. 17) may be "9"—in which case no movement whatever of gear sector 165 should accompany energization of the front interposer solenoid 74. This system of having the normal position of "9" opposite the pad is desirable, for the pinion 128 must be rotated only 330° (instead of 360°) to bring "12" into inking position; and the number of different actual angular movements required of gear sector 165 is eleven— not twelve. This system is assumed to have been adopted in the drawing, along with the quoted order of characters, above. So that this somewhat complicated system may be more readily understood, gear sector 165 must rotate pinion 128 30° to bring "8" into inking position, 60° to bring "7" into the same position, and so on, until 300° is required for "11" and 330° for "12." The immediate problem posed here is that, if 30° (say) rotation of gear sector 165 is effective in turning the pinion 128 360°, or a full cycle, then only 2°30″ (one twelfth of thirty degrees) rotation of gear sector 165 is necessary to turn the pinion 128 30°—or, in other words, to shift any peripheral character of the printing wheel 30°. For example "9," in normal and inking position, would be shifted by 2°30″ of gear sector 165 to bring "8" into inking positions.

It should be pointed out here that gear sector 165 should safely represent in its denticulated peripheral portion more than, say, 330° of rotation of pinion 128, for it is to be remembered that after gear sector 165 has done its work, gear sector 148 next adds 90° of rotation in the same direction to pinion 128; and gear sector 167 must never get out of mesh with pinion 128.

Each of the twelve interposer solenoids 74 are alike, and their respective armatures throw, upon energization, exactly the same distance to the right. But it will be recalled that the lefthand extension of each armature 75 is a yoke 76 which embraces a lever 77, pivoted (in platform 47) at 78 and held in normal position by a retractile spring 79 engaging bracket 80 (FIGS. 5 and 7).

The lefthand end of each yoke 76 comprises an upwardly extending ear 166 through which is threaded a horizontal adjustment screw 167, the threaded end of which is directed toward the armature 75 to which it relates. To fix the distance between the threaded end of any adjustment screw 167 and any other fixed part of the structure comprising the related armature 75 and yoke 76 is a locking nut 168, mounted on screw 167 and locked against the lefthand side of ear 166.

Accordingly, all twelve adjustment screws 167 may be variously adjusted and locked with respect to the related yoke 76 and armature 75; in short, each of the twelve screws may protrude to the right of ear 166 of the related yoke a different distance. In the foregoing it has been shown that twelve evenly escalated adjustments must be had from front to back of the array of adjustment screws 167 to accommodate the twelve different characters on the periphery of the printing wheel 120.

In keeping with the above-quoted order of characters on the periphery of the printing wheel and the election to have "9" normally opposed to the pad 153 of the inking cartridge, no operation whatever of gear sector 165 accompanies energization of the frontmost of the twelve interposer solenoids 74, but the angular change, from normal, of the sector must produce a 30° rotation of pinion 128 in accompaniment to energization of the second-from-front interposer solenoid, 60° rotation of the pinion upon energization of the third-from front solenoid, and so on. Eleven—not twelve—changes from normal position of gear sector 165 are envisioned; the end-product, of course, is to rotate pinion 128 not at all on energization of the front interposer solenoid, then 30° and multiples of 30° on energization of the other interposer solenoids, counting from front to rear—energization of the rear solenoid effecting a 330° angular change of the pinion (eleven times 30°).

With reference to FIG. 5, it is seen that two brackets 169 and 170 are mounted on platform 47, respectively to the front and to the rear of the array of adjustment screws 167 of armatures 74. Journaled in these brackets is an anterior-posterior shaft 171 which extends transversely above the array of adjustment screws (see FIG. 7, in which bracket 170 is obscured by bracket 169, and FIG. 9, in which the first named bracket obscures the last named). Rigidly fixed to and extending radially from shaft 171 on the rear side of the machine is an arm 172; pivotally mounted at 173, near the outer extremity of arm 172, is a link 174, which extends in a right hand direction to, and is pivotally connected to, gear sector 165 at 175—a point near the pivotal mount of the gear sector at 164. The amount, in degrees, the rotation of shaft 171, is accordingly greatly exaggerated by means of this linkage (i.e., involving arm 172, link 174, and gear sector 165) in the accompanying rotation of pinion 128 of the printing wheel 120; but, obviously, one twelfth of the number of degrees of rotation of shaft 171 possible in the present construction can be made to correspond exactly to 30° of rotation of pinion 128 by proper dimensioning of the parts of the linkage from the shaft 171 to the pinion 128. Therefore, the amount of rotation had by shaft 171 predetermines, herein, which character of the printing wheel shall be opposed to the pad 153 of the inking cartridge when the latter operates.

According to the drawing, "9" is opposed to pad 153 of the inking cartridge normally; no rotating whatever of shaft 171, gear sector 165, and pinion 128 takes place in positioning a character for inking if "9" is chosen; but if "8," or the second-from-foremost interposer solenoid is energized, the shaft 171, and gear sector 165, shall rotate enough to bring about a 30° counterclockwise turn of pinion 128 (viewed from the front), thereby bringing "8" into inking position; and so on, whereby, if "12," or the rearmost interposer solenoid is energized, the shaft 171, and gear sector 165, shall rotate enough to bring about a 330° (eleven times thirty degrees) counterclockwise turn of the pinion viewed from the same aspect.

Therefore, by preference but not in limitation of the invention, the amounts by which the twelve adjustment screws protrude to the right of their ears 166, and are so locked by their nuts 168, are from front to back, mathematically reducible to the series 1, 2, 3, 4, 5, 6, 7, 8, 9, 10, 11, and 12. There are eleven—not twelve— different steps or stages between a series of twelve like units all different by a certain multiplier. So, if adjustment screw 167 of the armature of the front interposer solenoid is taken as the datum, screw 167 of the armature of the rear most solenoid must protrude to the right eleven times as far as does the screw 167 of the armature of the front most solenoid.

The most illustrative figures are FIGS. 5, 7, and 9— rigidly mounted on and extending radially from shaft 171 (dotted lines only, FIGS. 7 and 9) is a plate-like cantilever, or better, vane 176, which is normally held in the retracted positions shown by a retractile spring 177, and, which so retracted, it rests against the righthand end of adjustment screw 167 of the rearmost interposer solenoid as a stop. Vane 176 is so wide (see FIG. 5) that it confronts all twelve adjustment screws 167.

If the front most interposer solenoid is energized, the full throw of its armature serves only to bring the righthand end of its related adjustment screws 167 to, and no farther than, vane 176. The vane does not move, nor do the shaft 171, gear sector 165, and pinion 128. Character "9" remains in inking position.

To clarify the somewhat complicated—sounding, but exceedingly simple, structure (comp., FIG. 5, particularly), if the second-from-foremost solenoid 74 is energized, its related adjustment screw 16) engages and moves vane 176 enough to effect a 30° turn of pinion 128, bringing "8" into inking position; if the third-from-foremost solenoid 74 is energized, its adjustment screw engages and moves the vane enough to effect a 60° turn of pinion 128, bringing "7" into inking position; and so on.

The subsequent rotation of pinion 128 by gear sector 148 to bring an inked character to the lowest position of the wheel for printing has already been described. Note that retractile spring 177 is incidentally stretched additionally by the operation of gear sector 148, because, as sector 148 drives the pinion 128 90° it also increases the displacement from normal of gear sector 165; but after the related series of timed energizations of solenoids is completed the associated retractile springs return various parts to normal positions.

Normally, after each punching operation, the machine automatically advances the tray 15 and its tabulation card a distance equal to that between center lines of columns of the card. The tray 15, like paper carriers of its class in the allied arts, is, of course, spring-loaded so that it tends, at any other position, to achieve its final position. Probably the most acceptable mechanism would involve the usual tape spring, which tends to form a helix. (Reference: a typewriter of almost any known make.) Of course there is nothing of inventive essence in the mechanism by which the tray 15 is spring-loaded to tend to move to the right of the machine, if free to do so; and, in consequence, any such mechanism is omitted from the drawing to simplify the latter, and is not further described herein. However, the tendency of the tray to move, if free, to the right, is to be understood with reference to the following matter.

The front edge of the tray 15 is provided with a rack 23 the teeth of which are disposed upwardly (FIGS. 1, 5, 6, 7, 8, and 9). As shown in FIGS. 8 and 14, the undersides of platform 47 and the punch guide 28 and platform 46 are all channeled longitudinally to permit free movement of the rack, the teeth of which are higher than any other part of the tray assembly. In FIG. 5 the punch guide 28, near its front end, is fenestrated at 178 to expose the rack. Mounted on platform 46 on the front portion thereof is a solenoid 179, referred to herein as the space solenoid. Its armature is designated 180, and its throw is toward the right of the machine. Its lefthand end is provided on front and back with triangular connectors 181 (see FIG. 7). Slightly to the left of armature 180 and set back out of its path, and mounted on the punch guide 128, is a bracket 182 (See FIG. 5) pivotally supporting at 183 on arm 184 of a toggle the other arm 185 of which is pivotally connected to the first at pin 186. A wire link 187 connects a pin 188 between connectors 181 with pin 186, so that operation of armature 180 causes the toggle to become straighter. This action causes the lower extremity of arm 185 to move downward slightly. Pivotally mounted at 189 is a rocker 190 having a springloaded pawl 191 at its right end and another such another such pawl 192 at its left end. The rocker 190 is pivotally connected to the lower end of arm 185 at 193. Throw and recovery to normal position of armature 180 effects a rocking of rocker 190. Energization of the space solenoid lifts pawl 192 from engagement against a ratchet tooth and lowers pawl 191 midway between two teeth. The springloaded tray 15 immediately moves forward until a tooth strikes panel 191; upon return of armature 180 to normal position the toggle operates to raise pawl 191 and to lower pawl 192 midway between two teeth. The tray immediately jumps forward until a tooth strikes pawl 192. So energization of solenoid 179 and subsequent recovery to normal position of armature 180 effects in two stages righthand movement of the tray a distance equal to the crests between two teeth of the rack 23, or, which is the same thing, a distance equal to that between centerlines of adjacent columns of a tabulation card.

The keyboard structure of the machine is designated in its entirety 200, and comprises a face plate suitably slotted for push buttons, the buttons themselves, switches actuated by the buttons, and a printed circuit panel parallel to and beneath the face plate, and secured to and separated therefrom by four posts.

If the machine is observed from above the observer sees the top and slanting skirts of a plastic hood 201, the slotted face plate 202 fitted within an L-shaped fenestration of the hood, and, in the embodiment herein illustrated fourteen labeled push buttons protruding through the slots of the face plate. For reasons of clarifying the circuitry of the machine hereinafter these buttons any of which are indexed 203, are referred to individually by their labels, which are clearly shown in FIG. 1. The buttons individually, although, as objects, all are like shaped plastic moldings. Each button appears above the face plate as a block about twice as long right and left as it is wide front and back. The upper edges of the buttons are beveled. That part of each button beneath the face plate is expanded peripherally so that the button cannot be removed upward from its slot.

The arrangement of the buttons of the keyboard is, of course, arbitrary; but the present arrangement has been found to be convenient. The buttons are arranged from front to back, in four rows paralleling the longitudinal axis of the machine. The first row comprises five buttons, labeled as follows: "Space," "Hold," "7," "8," and "9." The other rows have three buttons each, and their buttons are positioned longitudinally like buttons "7," "8," and "9." The second row from the front comprises buttons labeled "4," "5," and "6"; the third, buttons labeled "1," "2," and "3"; and the fourth, buttons labeled "12," "11" and "0" (zero).

FIG. 13 is a left elevation of the keyboard structure of the machine showing the general push button and switch arrangement, and is a section taken according to index A—A of FIG. 1. In this view the face plate 202 is seen in section and buttons labeled "9," "6," "3" and "0" (zero) from front to back are seen partly above and partly beneath the faceplate and the left hand edge of the printed circuit panel 204. The switches relating to all buttons except the button labeled "Hold" are alike.

With this exception, each switch comprises a leaf spring (indexed 205 if shaped like the letter L, and 206 if a mirror image thereof, see FIG. 11) secured at its short leg to the panel 204 by rivets 207 (all alike). The free leg 208 of each leaf spring rises from the position of the rivet at the corner of the leaf (see FIG. 19) and extends forwardly until it is nearly beneath a push button. Then the free leg is bent upward abruptly and then horizontally just beneath a plastic button 203. A suitable contact 209 is riveted in the horizontal portion of the leg 208 and is adapted to engage another contact on its under side. Just forward of the contact 209 the leg 208, the leg is bent vertically and terminates in a clip 210 which is inserted in a socket (not illustrated) in the bottom of button 203. The foregoing is a description of that part of the switch activated by a push button. The other part of any such switch is a short leaf 211 of spring Phosphor bronze or other suitable spring material riveted at 212 to the printed circuit panel, and its free part bent upward, and extends back in a curve and assumes substantial horizontality beneath a contact 209. At this position, which is near the rear end of part, a contact 213 is riveted and is adapted to engage the contact 209 of the same switch. When a button 203 is pressed downward, contact 209 on leg 208 engages contact 213 on part 213. Leaf 211 may be expected to be somewhat depressed by the pressure applied to the button 203, therefore, to limit downward movement of button 203, leg 208 contacts 209 and 213 and leaf 211 a small anvil 214 preferably of nylon or some other insulating material mounted on the printed circuit panel, is provided beneath the rear end of part 213.

In FIG. 18 the resilient legs 108 attached to buttons "9" and "3" necessarily completely obscure the like legs attached to other buttons to the right in the longitudinal rows corresponding the these buttons and the resilient legs 108 attached to the buttons "6" and "0" (zero) also necessarily completely obscure the like legs attached to other buttons to the right in the longitudinal rows corresponding to these buttons "6" and "0" (zero). Also the leaves 211 and the spring 215 and rivet 216 respectively obscure all leaves 211 and 215 to the right of them. The "Hold" button, when pressed, breaks rather than makes a contact. The button is supported in usual manner by a leaf 208 but no contact is provided in place of leaf 211 and it carries no contact 209. A slightly different leaf is provided in place of contact 213 with a contact 219. A special spring leaf 220, offset as shown in FIG. 19, and riveted at 221 to the printed circuit panel is provided for the "Hold" button. This leaf 220 carries at its raised offset end a contact 222, normally engaging contact 219 under tension. When the "Hold" button is depressed a nylon pin 223 fixed to the underside of the "Hold" button strikes the offset part of leaf 220 and separates contacts 219 and 222, special anvil for "Hold" button 224.

FIG. 11 is a top plan view of the printed circuit panel showing the switches mounted thereon and the printed circuit paths on the top surface of the panel.

The figure is in large measure self-explanatory. The arrangement of the four switches relating to buttons "9," "6," "3" and "0" (zero) have been described at length. The arrangements for buttons "8," "5," "2," and "11" next to the right, and for buttons "7," "4," "1," and "12" are duplicates. In FIG. 19 a button (the "9" button) is indicated in dotted lines as a reference; no other buttons are shown. The long spring leaf relating to the "Hold" button is like any leaf 208 except that it carries no contact 209: it is indexed 225. It is riveted to the printed circuit panel like any leaf L-shaped spring leaf 205. The long spring leaf relating to the "Space" button is in every respect a duplicate of any leaf 208 and is so indexed. The short leaf 211 relating to the "Space" button is like any other leaf 211 and is so indexed.

With reference to the printed circuit of FIG. 11 it will be noted that 226 is the common lead to all switches except the "Hold" switch. 227, the only other printed lead on the top surface of the panel 206 relates to the "Hold" switch (see below).

FIG. 12 is a bottom plan view of the panel 206 showing the printed leads, and various rivets and screws. The screws, all indexed 225, relate to the five posts holding the faceplate and the panel 206 parallel and at a distance from each other sufficient to accommodate the switches under the buttons.

It will be seen in FIG. 12 that there are thirteen printed leads terminating near what is the right hand edge of the panel, with respect to the machine, although, since FIG. 12 is a bottom plan view, pictorially the edge is to the right of the figure. Each one of twelve of these printed leads is connected, when the machine is assembled, with a particular interposer solenoid 74.

In FIG. 4, the circuit diagram, all elements included therein are clearly labeled; and a detail description of the circuit is felt to be unnecessary in view of the drawing.

In the following description of the operation of the machine much reference to FIG. 4 will be found to be helpful.

*The Operation of the Machine*

The commonest operation of the machine takes place in response to an operator's pressing and then releasing but a single push button of the keyboard—that button being one of the ten having a digit label. The machine thereupon automatically punches a digit from the column of the tabulation card at the coding station; imprints a like digit at the top of the column; and moves the tabulation card to the right a distance equal to the width of one column, thereby bringing the next column in numerical order to the coding station.

A less usual operation of the machine takes place in response to an operator's simultaneously pressing both a push button having a digit label and the button labeled "Hold," and then, after both buttons are relieved of pressure, pressing another button. In this more complicated operation, the initial pressing together of the two named buttons automatically punches a digit from the par column of the tabulation card at the coding station, and then imprints a like digit at the top of the column; but since the operator is also pressing the button labeled "Hold," the machine does not move the card at all, and the identical column remains at the coding station. Next, after the operator has released the two buttons mentioned, she presses another button, whereupon a hole is punched in the card in the identical column, spaced from that row as if it represented an adjacent punched-out digit; next, the machine overprints the priorly imprinted digit with a symbol relating to button "11" (say, a circle) or one relating to button "12" (say, a square)—the general idea being that the overprinted symbols shall be recognizable but shall not efface the earlier printed digit; and then, when the operator takes her finger off the button "11" or "12," as the case may be, the machine automatically moves the card forward one column.

Another operation is "stepping" the card forward a column at a time, without punching or imprinting it, which involves the operator's simple repetitive pressing of the push button labeled "Space." This operation occurs when the operator wishes to avoid coding certain columns.

Of course, another operation, not described herein for reasons set forth above, is to "tab" the card—which is the equivalent, as in the common typewriter mechanism, of the operation following one or more manipulations of the "space" button.

The commonest operation of the machine will be described first. Reference should be had to FIG. 4, the circuit diagram. It should be noted that much of the following operation is duplicated in part when the "Hold" push button is pressed and when that button is released following a digital punching-out and imprinting, and another button is pressed.

Here, in the commonest operation of the machine, the operator seeks to effect a punching out of a digit, an imprinting of the digit above the punched-out column, and a stepping forward of the tabulation card by one column.

(1) The operator presses one of the ten push buttons labeled with a digit.

(2) The switch of this button is closed, completing the circuit through one of the first ten interposer solenoids 74, counting from the front.

(a) It will be noted in FIG. 4 that one leg of the main line from the power source is directly connected to one contact of each push-button-actuated switch of the key board, except that switch relating to the button labeled "Hold," by means of the printed circuit connector and the printed circuit common lead; and that the other leg of the main line is directly connected to one coil terminal of each of the twelve interposer solenoids, as well as to switch A and other elements. From the printed circuit connector the abovementioned "other leg" may be completed to the other coil terminal of each of the interposer solenoids by pressing appropriate push buttons.

(3) The armature 75 of that solenoid throws to the right.

(a) Armature 75, through pin 81, bar 82, and pivotal connection at 84, pushes element 83 into interposition between punch striker lever 48 and punch 34. The action of interposing takes place at the same rate of speed and in exactly the same manner without respect to which solenoid 74 is energized.

(b) Adjustment screw 167 moves to the right with ear 166 of yoke 76 of armature 75. If this screw relates to any interposer solenoid 74 other than the frontmost, the screw, at some stage of the throw of armature 75, depending upon the solenoid excited (and, of course, upon the adjustment of the screw, i.e., the length to the right of ear 166 of yoke 76) strikes and pushes vane 176 radially, effecting appropriate rotation of shaft 171 and arm 172, movement of link 174, and appropriate rotation of gear section 165 and pinion 128, bringing a particular character of the printing wheel into inking position. If this screw relates to the frontmost solenoid 74, it reaches, but does not move vane 176, for this solenoid relates to the frontmost punch 34, which punches out the digit "9"; and "9" is normally in the inking position.

(c) Just before the end of the throw of armature 75, its cam face 96 contacts cam face 94 of bar 93 of lever 90, depressing the bar and the left hand end of the lever, and actuating, by means of the right hand end portion of lever 90, switch A, thereby completing the circuit through the punch solenoid 58.

(d) It will be noted in FIG. 4 that switch A, which is actuated, as described above, by movement of armature 75 of an interposer solenoid 74 normally serves as a lead-through for one leg of the main line to the space solenoid, and therethrough and beyond (see below). The action of armature 75 is to disconnect the space solenoid from this leg of the main line and to connect the other coil terminal of the punch solenoid thereto. This, of course, effects energization of the latter solenoid. The same actuation of switch A, however, connects to and through the printing solenoid to a contact of switch C (see below). (The printing solenoid is not energized; nor is the contact of switch C then conducting.)

(4) The armature 62 of solenoid 58 throws to the right.

(a) Armature 62, through link 66 and the toggle of various parts to the left thereof, actuates the punch striker lever 48, one tooth 51 of which pushes an element 83 downward; forcing a punch 34 to pass through the card.

(b) Simultaneously, movement of armature 62, by means of bracket 67, swings lever 156; dog 158 at rear end portion of lever kicks ear 162 of holder 151 of ink cartridge 121, forcing inking pad 153 against character on printing wheel 120 facing it. Inking mechanism independently snaps back to normal after the kick, without respect to continued energization of punch solenoid 58.

(c) Near end of throw of armature 62 it engages switch B, thereby completing the circuit through the positioning solenoid 127.

(5) The armature 142 of the positioning solenoid 127 throws to the left.

(a) Armature 142, through link 145, actuates gear sector 149, rotating inked character of printing wheel 120 90° to printing position.

(b) Near end of throw of armature 142 it engages switch C thereby completing the circuit through the printing solenoid 126. It will be noted in FIG. 4 that the same actuation of switch A which effects energization of the punch armature, sets up, but does not energize, the printing solenoid and its particular contact in switch C (see above). When armature 142 closes switch C, the printing solenoid is energized through switch A, held in position by interposer solenoid up to this line.

(6) The armature 133 of solenoid 126, through linkages, depresses cantilever 130 and stamps printing wheel 120 against card—the bottom-positioned newly-inked character leaving its print on the card.

(7) Operator releases pressure on selected push button.

(8) The switch of that button is opened, breaking the circuit through solenoid 74.

(9) Due to lost motion between pin 81 of armature 75 of solenoid 74 and bar 82 of interposing device, retractile spring 79, through lever 77 and yoke 76, draws armature 75 off bar 93 of lever 90, breaking the circuit through the punch solenoid 58 by opening switch A.

It should be remembered here that while this action also effects de-energization of the printing solenoid, because of the return to normal position of switch A, the positioning solenoid, having closed switch C is thereby held in energization. Note that the positioning solenoid continued to be excited on account of switch D, which is normally closed.

The printing wheel moves upward from the card; but the gear sector 149 remains in mesh with pinion 128. Also, for this reason, gear sector 165 is unable to return to normal by action of retractile spring 177 of vane 176. Gear sector 149 temporarily has the printing-wheel-positioning mechanisms locked, because the positioning solenoid remains excited.

(10) Armature 62 of punch solenoid 58 returns to normal position due to retractile spring 68; this action returns punch striker lever 48 to normal position, releasing element 83 of interposing device whereby armature 75 of solenoid 74 may fully retract.

This action also opens switch B; but this is now immaterial, for the positioning solenoid does not rely exclusively upon switch B; switch C—closed by the solenoids' original energization—keeping the solenoid excited.

Solenoids 74, 58, and 126 are dropped; but the positioning solenoid 127 is not.

(11) As armature 75 returns to normal position, or at least moves away from bar 93, switch A returns to normal.

The circuit is now complete through not only the positioning solenoid, due to the positions of switches C (abnormal) and D (normal), but also through the space solenoid.

On energization of the space solenoid, upon the return to normal of switch A, switch D is opened; the positioning solenoid is deenergized; switch C returns to normal, de-energizing the space solenoid.

Gear sector 149 jumps out of mesh with pinion 128 of the printing wheel 120, incidentally rotating it 90° in a direction opposite to that of the initial engagement of gear sector 149. As soon as the latter is free of the pinion, gear sector 165 is free to return to normal under the pull of retractile spring 177 of vane 176.

The machine is now ready for another cycle of operation.

The operation involving the punching and printing of a digit with the mechanism prevented from then advancing the card, and the following punching of one of the two spaced holes above the zero row of digits and the printing, or overprinting, of a symbol indicating the particular spaced hole, is mainly different from what has been described by the changes brought about by pressing the "Hold" button while pressing a digit button.

The switch beneath the "Hold" push button, instead of making contact upon pressure, breaks contact; and in this way the "Hold" button switch is different from the other thirteen of the key board. The break is made in what ordinarily becomes the circuit embracing the space solenoid. Therefore, so long as the "Hold" switch is kept open by pressure upon its related push button, the tabulation card cannot be advanced in usual manner. After the operator has, at the same time, depressed a digit button and the "Hold" button, and the punching and printing operations have taken place with respect to the selected digit, the operator should then take her finger off the "Hold" button, as well as the digit button, and then press another button. A hole will be punched in the identical column above the zero row, and a symbol will be overprinted on the imprint of the digit. Then, after the operator relieves pressure on the special "11" or "12" button, spacing takes place as described above.

The operation of simply spacing the card step by step (or better, column by column) requires only pressure upon the space button. See FIG. 4, which is fully illustrative.

What is claimed is:

1. In apparatus of the class described, a die having a series of like holes therein; a series of like punches, each thereof adapted to cooperate with one of the holes and normally held retracted by a spring at a distance from the die common to all punches; a hammer as wide as the series of punches normally held at a distance from the punches and capable of movement toward but only to the punches; a series of substantially incompressible elements, there being one element for each punch capable of being moved between that punch and the hammer; a series of solenoids, there being as many such solenoids as there are elements and punches, each solenoid adapted to move an element between its related punch and the hammer; a printing wheel having a number of characters thereon, there being one character corresponding to each punch, and means whereby each solenoid upon energization rotates the printing wheel to bring a particuflar character thereof into a certain position; a solenoid for moving the hammer; another solenoid for moving the printing wheel edgewise; a number of push buttons with each thereof labeled to correspond to a particular punch, element, and character, and each controlling energization of one of said series of solenoids; and means actuated by energization of each of said series of solenoids for energizing the solenoid for moving the hammer, energization of the latter solenoid effecting energization of the solenoid for moving the printing wheel edgewise.

2. The combination of claim 1, including an inking cartridge adapted to deposit a film of ink on a character of the printing wheel when the character is in said certain position, said cartridge being activated by the solenoid for moving the hammer.

3. The combination of claim 1, including an inking cartridge adapted to deposit a film of ink on a character of the printing wheel when the character is in said certain position, said cartridge being actuated by the solenoid for moving the hammer, and another solenoid adapted to rotate the printing wheel so as to bring the inked character into printing position before the printing wheel is moved edgewise, said other solenoid being energized by the solenoid for moving the hammer.

4. In apparatus of the class described, a die having a series of like holes therein; a series of like punches, each thereof adapted to cooperate with one of the holes and normally held retracted by a spring at a distance from the die common to all punches; a lever having one end as wide as the series of punches, the lever being normally held so that such end is at a distance from the punches, with such lever rockable toward but only to the punches; a series of substantially incompressible elements, there being one element for each punch capable of being moved between that punch and the end of the lever; a series of solenoids, there being as many such solenoids as there are elements and punches, each solenoid adapted to move an element between its related punch and the end of the lever; a printing wheel having a number of characters thereon, there being one character corresponding to each punch, and means whereby each solenoid upon energization rotates the printing wheel to bring a particular character thereof into a certain position; a solenoid for rocking the lever; another solenoid for moving the printing wheel edgewise; a number of push buttons with each thereof labeled to correspond to a particular punch, element, and character, and each controlling energization of one of said series of solenoids; and means actuated by energization of each of said series of solenoids for energizing the solenoid for rocking the lever, energization of the latter solenoid effecting energization of the solenoid for moving the printing wheel edgewise.

5. The combination of claim 4, including an inking cartridge adapted to deposit a film of ink on a character of the printing wheel when the character is in said certain position, said cartridge being actuated by the solenoid for rocking the lever.

6. The combination of claim 4, including an inking cartridge adapted to deposit a film of ink on a character of the printing wheel when the character is in said certain position, said cartridge being actuated by the solenoid for rocking the lever, and another solenoid adapted to rotate the printing wheel so as to bring the inked character into printing position before the printing wheel is moved edgewise, said other solenoid being energized by the solenoid for rocking the lever.

References Cited in the file of this patent

UNITED STATES PATENTS

| | | |
|---|---|---|
| 650,268 | Norwood | May 22, 1900 |
| 1,370,669 | Potts | Mar. 8, 1921 |
| 1,682,690 | Stoddard | Aug. 28, 1928 |
| 2,013,540 | Kolm et al. | Sept. 3, 1935 |
| 2,228,464 | Kraft et al. | Jan. 14, 1941 |
| 2,625,225 | Wockenfuss | Jan. 13, 1953 |
| 2,749,986 | Maul | June 12, 1956 |